United States Patent
Imamura

(10) Patent No.: US 9,742,841 B2
(45) Date of Patent: Aug. 22, 2017

(54) DATA PROCESSING MANAGEMENT METHOD AND INFORMATION PROCESSING APPARATUS

(71) Applicant: FUJITSU LIMITED, Kawasaki-shi, Kanagawa (JP)

(72) Inventor: Nobutaka Imamura, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 124 days.

(21) Appl. No.: 14/499,321

(22) Filed: Sep. 29, 2014

(65) Prior Publication Data

US 2015/0100616 A1    Apr. 9, 2015

(30) Foreign Application Priority Data

Oct. 7, 2013 (JP) .................................. 2013-209824

(51) Int. Cl.
    *H04L 29/08*    (2006.01)
    *G06F 9/48*     (2006.01)

(52) U.S. Cl.
    CPC ............ *H04L 67/10* (2013.01); *G06F 9/4856* (2013.01)

(58) Field of Classification Search
    CPC .............................. H04L 67/10; G06F 9/4856
    See application file for complete search history.

(56) References Cited

U.S. PATENT DOCUMENTS

| | | | | |
|---|---|---|---|---|
| 7,484,208 B1* | 1/2009 | Nelson | ................ | G06F 9/45558 711/6 |
| 7,577,657 B2* | 8/2009 | Earhart | ................... | G06F 9/526 |
| 2004/0111511 A1 | 6/2004 | Maeda et al. | | |
| 2004/0260862 A1* | 12/2004 | Anderson | ............. | G06F 3/0605 711/100 |
| 2005/0038848 A1 | 2/2005 | Kaluskar et al. | | |
| 2007/0011422 A1* | 1/2007 | Srinivasan | ........ | G06F 17/30244 711/165 |

(Continued)

FOREIGN PATENT DOCUMENTS

| JP | 2004-078465 | 3/2004 |
|---|---|---|
| JP | 2010-272076 | 12/2010 |

(Continued)

OTHER PUBLICATIONS

Japanese Office Action mailed Mar. 21, 2017 for corresponding Japanese Patent Application No. 2013-209824, with Partial English Translation, 6 pages.

(Continued)

*Primary Examiner* — Larry Donaghue
(74) *Attorney, Agent, or Firm* — Fujitsu Patent Center

(57) ABSTRACT

First and second machines execute a plurality of distributed processes. A storing unit stores therein progress information of a process executed by the first machine. A calculating unit transmits the progress information to the second machine upon receiving a reassignment instruction indicating reassignment of the process to the second machine. The calculating unit transmits data to be used in the process to the second machine together with the progress information upon receiving the data during the transmission of the progress information. Upon receiving the progress information and the data, the second machine executes the process reassigned from the first machine using the progress information and the data.

6 Claims, 26 Drawing Sheets

(56) References Cited

U.S. PATENT DOCUMENTS

| | | |
|---|---|---|
| 2010/0299472 A1 | 11/2010 | Tanaka et al. |
| 2012/0084788 A1 | 4/2012 | Sakamoto |
| 2015/0193250 A1* | 7/2015 | Ito .......................... G06F 9/4856 718/1 |
| 2015/0234618 A1* | 8/2015 | Miwa .................... G06F 3/0647 711/165 |

FOREIGN PATENT DOCUMENTS

| | | |
|---|---|---|
| JP | 2012-079242 | 4/2012 |
| JP | 2012-248169 A | 12/2012 |

OTHER PUBLICATIONS

Takahashi, Masahiko et al., "Implementation of Process Migration with TCP Session Continuity suitable for Data Center Environments", IPSJ SIG Technical Report, vol. 2004, No. 63, pp. 29-36, Jun. 17, 2004, see JPOA for English Translation and English Abstract.

Extended European Search Report issued on Jun. 8, 2016 for corresponding European Patent Application No. 14186610.3, 6 pages.

Chinese Office Action dated May 22, 2017 for corresponding Chinese Patent Application No. 201410522191.8, with Partial English Translation, 16 pages.

* cited by examiner

EXAMPLE OF EVENT

| EVENT TYPE | STREAM NAME | CONTENT |
|---|---|---|
|  |  |  |
| P | InputStream | 1000W |

EXAMPLE OF QUERY                                        111

| 1 | insert into OutputStream |
|---|---|
| 2 | select * |
| 3 | from pattern [ every A=InputStream -> B=InputStream -> C=InputStream ] |

FIG. 8

EXAMPLE OF QUERY STATE

A AND B HAVE ALREADY ARRIVED,
AWAITING ARRIVAL OF C

| QUERY DEPLOYMENT TABLE | | | | | |
|---|---|---|---|---|---|
| QUERY NAME | ASSIGNED NODE NAME | STATUS | REFERENCE TO QUERY STATE | LOCK | WAIT EVENT |
| Query1 | NODE 100 | BEING MIGRATED TO NODE 200 | &Query1State | UNLOCKED | null |
| Query8 | NODE 200 | IN OPERATION | ABSENT IN NODE | UNLOCKED | null |
| Query10 | NODE 300 | IN OPERATION | ABSENT IN NODE | UNLOCKED | null |
| ... | ... | ... | ... | ... | ... |

FIG. 10

| QUERY DEPLOYMENT TABLE | | | | | |
|---|---|---|---|---|---|
| QUERY NAME | ASSIGNED NODE NAME | STATUS | REFERENCE TO QUERY STATE | LOCK | WAIT EVENT |
| Query1 | NODE 100 | BEING MIGRATED TO NODE 200 | ABSENT IN NODE | UNLOCKED | $\alpha 5, \alpha 6$ |
| Query8 | NODE 200 | IN OPERATION | &Query8State | UNLOCKED | null |
| Query10 | NODE 300 | IN OPERATION | ABSENT IN NODE | UNLOCKED | null |
| ... | ... | ... | ... | ... | ... |

FIG. 11

| QUERY DEPLOYMENT TABLE | | | | | |
|---|---|---|---|---|---|
| QUERY NAME | ASSIGNED NODE NAME | STATUS | REFERENCE TO QUERY STATE | LOCK | WAIT EVENT |
| Query1 | NODE 100 | IN OPERATION | ABSENT IN NODE | UNLOCKED | null |
| Query8 | NODE 200 | IN OPERATION | ABSENT IN NODE | UNLOCKED | null |
| Query10 | NODE 300 | IN OPERATION | &Query10State | UNLOCKED | null |
| ... | ... | ... | ... | ... | ... |

FIG. 12

EXAMPLE OF TRANSMISSION DATA MANAGEMENT STRUCTURE ⬈ D

| | |
|---|---|
| Forward | &SendBufStructure |
| Backward | &SendBufStructure |
| Query State | &QueryState |
| Events | &Events [ ] |

FIG. 13

DATA PROCESSING MANAGEMENT METHOD AND INFORMATION PROCESSING APPARATUS

CROSS-REFERENCE TO RELATED APPLICATION

This application is based upon and claims the benefit of priority of the prior Japanese Patent Application No. 2013-209824, filed on Oct. 7, 2013, the entire contents of which are incorporated herein by reference.

FIELD

The embodiments discussed herein are related to a data processing management method and an information processing apparatus.

BACKGROUND

Data may be processed by a distributed processing system including a plurality of machines. Such machines may include physical computers (sometimes referred to as physical machines or physical hosts), or virtual computers (sometimes referred to as virtual machines or logic hosts) operating on physical machines. For example, complex event processing, or CEP, may be performed using a distributed processing system. The plurality of machines execute, in parallel, a plurality of events issued by various apparatuses, thereby processing the plurality of events at high speed.

In a distributed processing system, it is sometimes the case that a change is made to process assignment to individual machines in order to balance processing load among the machines. Therefore, there have been proposed various techniques for changing process assignment. For example, one proposed technique is concerned with migration of a process being executed by a first computer to a second computer, and directed to shortening the stop time of the process during the migration by continuing the execution of the process by the first computer whilst transmitting a copy of the process to the second computer.

Another proposed technique is concerned with migration of a task running on a processor to another processor, and directed to that the source processor executes a transfer task for transferring the migration target task to the destination processor, and the transfer task starts an interrupt process upon reception of an interrupt request for the migration target task during the transfer.

Yet another proposed technique is directed to distributing complex event processes to a plurality of virtual machines based on the degree of association among the complex event processes when detecting a virtual machine whose processing load has exceeded a predetermined threshold.

Japanese Laid-open Patent Publication No. 2004-78465
Japanese Laid-open Patent Publication No. 2010-272076
Japanese Laid-open Patent Publication No. 2012-79242

When a change is made in assignment of data processing, it is sometimes the case that the progress of a process before the change is desired to be passed over to the process after the change. For example, in the case where a process is carried out for a plurality of events, if some of the events have already occurred, the state of those events having already occurred may be desired to be maintained also after a change in the assignment of the process. In view of this, it is considered to provide a report on the progress of the process by an originally assigned first machine to a newly assigned second machine to thereby cause the second machine to take over the process in the middle. However, data to be used in the process reassigned to the second machine may be input to the first machine during the transmission of the progress information from the first machine to the second machine. The data handling in this situation is problematic.

Assume, for example, that the first machine continues to process the input data, as in the proposed technique described above. However, if the data is continuously sent to the first machine, the first machine is not able to finish the process and it may therefore take too long to allow the second machine to start the process. Assume, on the other hand that, the first machine stops the process and transmits, to the second machine, the data input to the first machine after completing transmission of the progress information, to thereby cause the second machine to resume the process. In this case, waiting for the completion of transmission of the progress information and then again waiting to transmit the data to the second machine may delay the arrival of the data at the second machine, thus delaying the resumption of the process at the second machine.

SUMMARY

According to an aspect, there is provided a data processing management method executed in a system including a first computer and a second computer. The data processing management method include: transmitting, by the first computer, progress information of a process executed by the first computer to the second computer upon reception of an instruction to reassign the process to the second computer; and transmitting, by the first computer, data associated with the process to the second computer upon reception of the data during the transmission of the progress information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of an event;
FIG. 8 illustrates an example of a query;
FIG. 10 illustrates a first example of a query deployment table;
FIG. 11 illustrates a second example of the query deployment table;
FIG. 12 illustrates a third example of the query deployment table;

FIG. 13 illustrates an example of a transmission data management structure;

DESCRIPTION OF EMBODIMENTS

Figure 1:
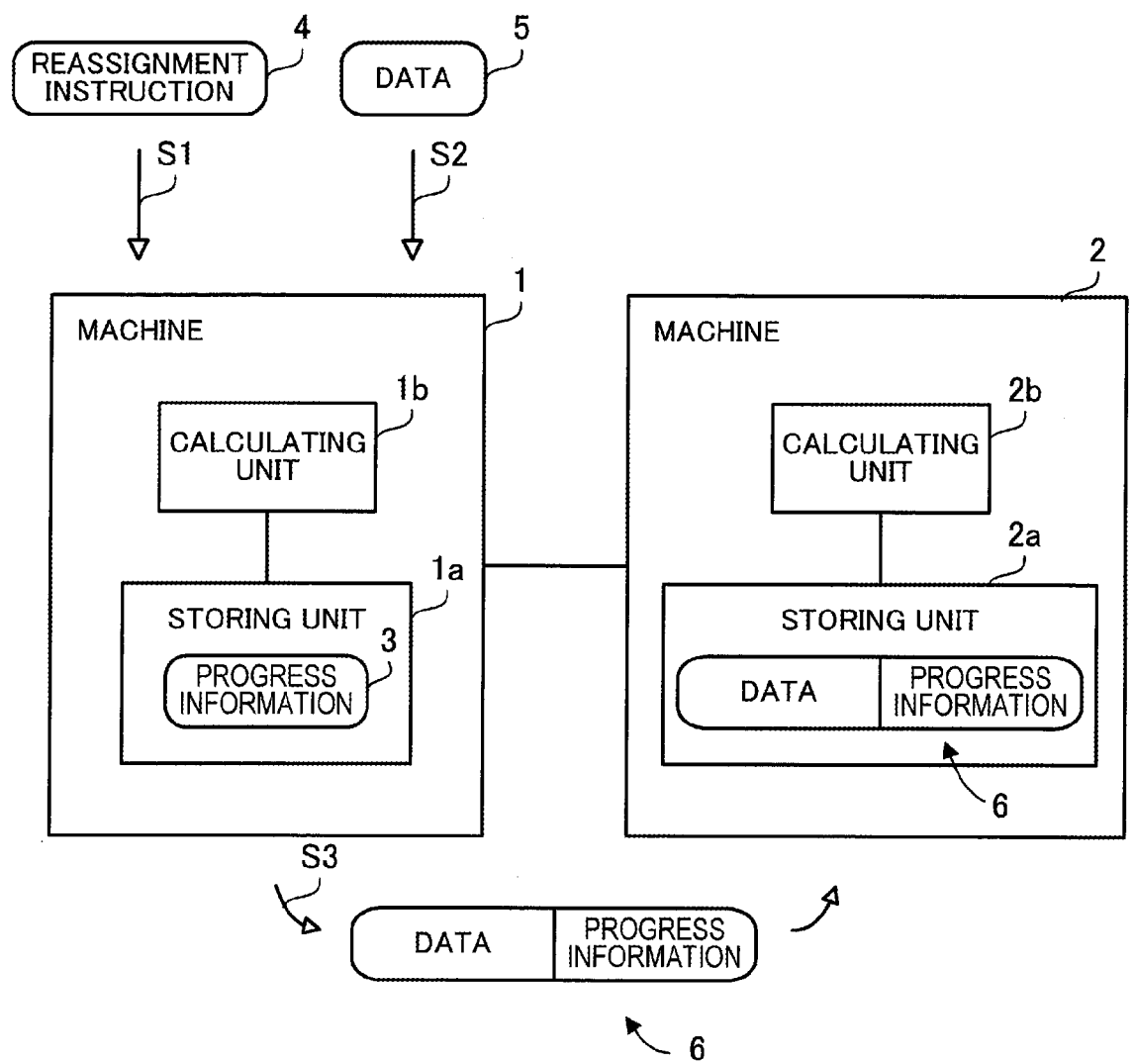
FIG. 1 illustrates a distributed processing system according to a first embodiment.

Several embodiments will be described below with reference to the accompanying drawings, wherein like reference numerals refer to like elements throughout.

(a) First Embodiment

FIG. 1 illustrates a distributed processing system according to a first embodiment. The distributed processing system of the first embodiment has a plurality of machines including machines 1 and 2. The plurality of machines are connected to a network and are thereby capable of communicating with each other. In this distributed processing system, a plurality of processes are distributed to and executed by the plurality of machines.

Assume here that the machines 1 and 2 of the first embodiment are physical machines. Note however that the machines 1 and 2 may be virtual machines. For example, the machines 1 and 2 may be virtual machines running on different physical machines, or may be virtual machines running on a single physical machine (a computer system equipped with a storage device, a processing unit, and so on).

The machine 1 includes a storing unit 1a and a calculating unit 1b. The machine 2 includes a storing unit 2a and a calculating unit 2b. The storing unit 1a/2a may be a volatile storage device, such as random access memory (RAM), or a non-volatile storage device, such as a hard disk drive (HDD) and flash memory. The calculating unit 1b/2b may include, for example, a central processing unit (CPU), a digital signal processor (DSP), an application specific integrated circuit (ASIC), and a field programmable gate array (FPGA). The calculating unit 1b/2b may be a processor executing programs. The term 'processor' here includes a computer system having a plurality of processors (i.e., multiprocessor).

The storing unit 1a stores progress information of each process assigned to the machine 1. Progress information 3 is progress information of one of the processes. For example, if the distributed processing system of the first embodiment is a system executing a predetermined process for a plurality of input data sets, the storing unit 1a stores, as the progress information 3, information indicating that some of the input data sets have already arrived. A system executing CEP is an example of such a system. In that case, the storing unit 1a stores, as the progress information 3, information indicating that that some of a series of events have already arrived.

The calculating unit 1b executes a plurality of processes assigned to the machine 1. The calculating unit 1b records the execution status of each process as progress information of the process, and stores the progress information in the storing unit 1a. For example, the calculating unit 1b carries out this procedure for each of the plurality of input data sets. Specifically, each time receiving one of the plurality of input data sets, the calculating unit 1b may record, in the progress information 3, information indicating that the input data set has already arrived (i.e., the input data set has already been processed).

When receiving an instruction (a reassignment instruction 4) to reassign a process executed by the machine 1 to the machine 2, the calculating unit 1b transmits, to the machine 2, the progress information 3 corresponding to the process designated by the instruction. For example, the calculating unit 1b may receive the reassignment instruction 4 from a predetermined apparatus managing the assignment of processes. Alternatively, the calculating unit 1b may receive the reassignment instruction 4 issued in response to an operation input made by a user on a predetermined input device connected to the machine 1.

Note here that programs used to execute individual processes are prestored, for example, in the storing unit 1a/2a. For example, when a process is assigned to its own machine, the calculating unit 1b/2b stores, in RAM, a program corresponding to the process, stored in a HDD or the like, and then executes the program to thereby put the process into a state of waiting for data input.

Upon receiving data 5 to be used in the reassigned process during transmission of the progress information 3 of the process to the machine 2, the calculating unit 1b transmits the data 5 to the machine 2 by adding the data 5 to the progress information 3. The period of the information transmission includes a preparation period for sending out (a period for transmission preparation) the information onto the network. For example, the preparation period includes periods for serialization, buffering, and the like. The serialization is the process of converting the progress information 3 into a transfer format used in the network. The buffering is the process of accumulating information to be transmitted to a predetermined amount. During the transmission of the progress information 3 from the machine 1 to the machine 2, the execution of the process corresponding to the progress information 3 is interrupted.

For example, upon receiving the reassignment instruction 4, the calculating unit 1b serializes and buffers the progress information 3 stored in the storing unit 1a and generates transmission data including the progress information 3. Upon receiving the data 5 during the generation of the transmission data, the calculating unit 1b includes the data 5 in the transmission data to thereby generate transmission data 6. The transmission data 6 may include information other than the progress information 3 and the data 5. The calculating unit 1b transmits the transmission data 6 to the machine 2.

Upon receiving the transmission data 6, the machine 2 acquires the progress information 3 and the data 5 from the transmission data 6. Using the progress information 3 and the data 5, the machine 2 resumes the process reassigned to the machine 2 from the machine 1.

According to the distributed processing system of the first embodiment, the machine 1 receives the reassignment instruction 4 to reassign a process executed by the machine 1 to the machine 2 (step S1). The machine 1 receives the data 5 to be used in the process during the transmission of the progress information 3 of the process to the machine 2 (step S2). Then, the machine 1 adds the data 5 to the progress information 3 and then transmits the data 5 to the machine 2 (step S3).

Herewith, it is possible to shorten the delay in resuming a process at a newly assigned destination (the machine 2 in the above example). In this regard, it may be considered acceptable, for example, to allow the machine 1 to continue the reassigned process during the transmission of the progress information 3. However, it is sometimes the case that a plurality of data sets including the data 5 in association with the process are continuously input to the machine 1. In this case, the machine 1 is not able to finish the process and it therefore takes too long to complete the reassignment of the process to the machine 2. In addition, in spite of the fact that the process reassignment is intended to alleviate the high processing load of the machine 1, the machine 1 is continuously heavily loaded. What is more, such a situation is more likely to arise as the processing load of the machine 1 is higher. Furthermore, when the machine 1 continues executing the process, differences due to updates are created in the progress information 3. As a result, the machine 1 also has to continue providing the differences in the progress information 3 to the machine 2, thereby consuming more network bandwidth.

On the other hand, it may also be considered acceptable to interrupt the reassigned process at the machine 1, and transmit the data 5 to the machine 2 after completing transmission of the progress information 3, to thereby cause the machine 2 to resume the process. However, the information transmission takes long because of procedures taking place at the transmitting side, such as serialization and buffering, and procedures taking place at the receiving side, such as deserialization. Therefore, waiting for the completion of the transmission of the progress information 3 and then again waiting to transmit the data 5 may delay the arrival of the data 5 at the machine 2, thus delaying the resumption of the process at the machine 2.

In view of the above problems, if receiving the data 5 to be used in the reassigned process during transmission of the progress information 3 of the process to the machine 2, the machine 1 transmits the data 5 to the machine 2 by adding the data 5 to the progress information 3. For example, even if a plurality of data sets including the data 5 are continuously input to the machine 1, the machine 1 is able to provide the data sets (or some of the data sets) together with the progress information 3 to the machine 2. Because of being able to acquire the data 5 with the progress information 3, the machine 2 starts the reassigned process straight away using the progress information 3 and the data 5. In addition, since the process is discontinued at the machine 1, there is no need for the machine 1 to continuously provide the progress information 3 to the machine 2. As a result, compared to the case where the process is continued at the machine 1, the processing load of the machine 1 is reduced quickly, and the usage of the network bandwidth is also reduced.

Furthermore, because the data 5 is provided to the machine 2 together with the progress information 3, there is no need to wait for the completion of the transmission of the progress information 3 and then again wait to transmit the data 5. Therefore, the time for the data 5 to arrive at the machine 2 is shortened, which shortens the delay in resuming the reassigned process at the machine 2.

(b) Second Embodiment

Figure 2:
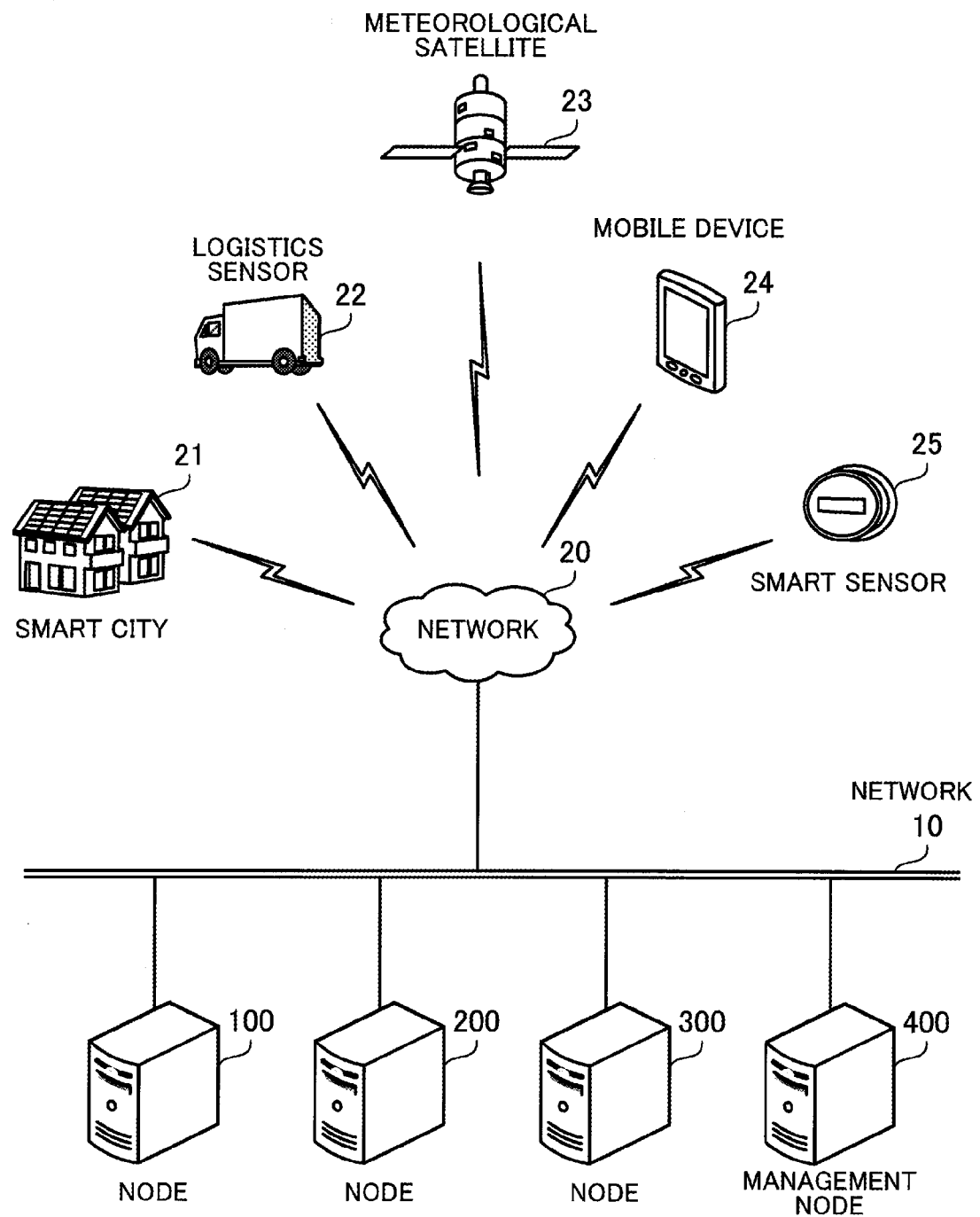
FIG. 2 illustrates a distributed processing system according to a second embodiment.

FIG. 2 illustrates a distributed processing system according to a second embodiment. The distributed processing system of the second embodiment includes nodes 100, 200, and 300 and a management node 400. The nodes 100, 200, and 300 and the management node 400 are connected to a network 10 which is, for example, a local area network (LAN).

The network 10 is connected to a network 20, which may be a broad area network such as a wide area network (WAN) and the Internet. To the network 200, the following are connected wirelessly or by wire: a smart city 21, a logistics sensor 22, a meteorological satellite 23, a mobile device 24, and a smart sensor 25. Various other types of apparatuses issuing events may be connected to the network 20. The distributed processing system of the second embodiment executes CEP using the nodes 100, 200, and 300.

The nodes 100, 200, and 300 are server computers for processing events, and process in parallel various sorts of events issued by the smart city 21, the logistics sensor 22, the meteorological satellite 23, the mobile device 24, the smart sensor 25 and the like. The nodes 100, 200, and 300 may carry out predetermined processes on processing results (new events) obtained from a plurality of events.

The nodes 100, 200, and 300 are able to implement the following functions using CEP. For example, the nodes 100, 200, and 300 control power saving of the smart city 21 based on information of power consumption acquired by the smart city 21 and smart sensor 25 connected through the network 20. In addition, the nodes 100, 200, and 300 provide the mobile device 24 with navigational assistance appropriate to circumstances, for example, of a user of the mobile device 24 and his/her car based on traffic situation information acquired from various types of apparatuses connected to the network 20. The nodes 100, 200, and 300 also provide the mobile device 24 with weather forecast information based on events acquired from the meteorological satellite 23 and radar. Further, the nodes 100, 200, and 300 provide a report on the presence or absence of an intrusion to a house and a report on the whereabouts of family members (young children and the elderly, for example). The nodes 100, 200, and 300 are able to provide users with various other types of information.

Note that processes executed by the nodes 100, 200, and 300 in response to events are hereinafter called queries. Programs describing the content of queries are provided to the nodes 100, 200, and 300 in advance. The programs may be referred to as rules or rule information describing processes corresponding to events. In the following description, the term 'each node' is sometimes used to refer to each of the nodes 100, 200, and 300.

The management node 400 is a server computer for designating a node to be in charge of event processing of each query (i.e., assigning each query to a node). For example, the management node 400 distributes processing load across the nodes 100, 200, and 300. The managing node 400 makes changes to query assignment according to the processing load of the individual nodes 100, 200, and 300, to thereby balance the processing load among the nodes 100, 200, and 300.

Figure 3:
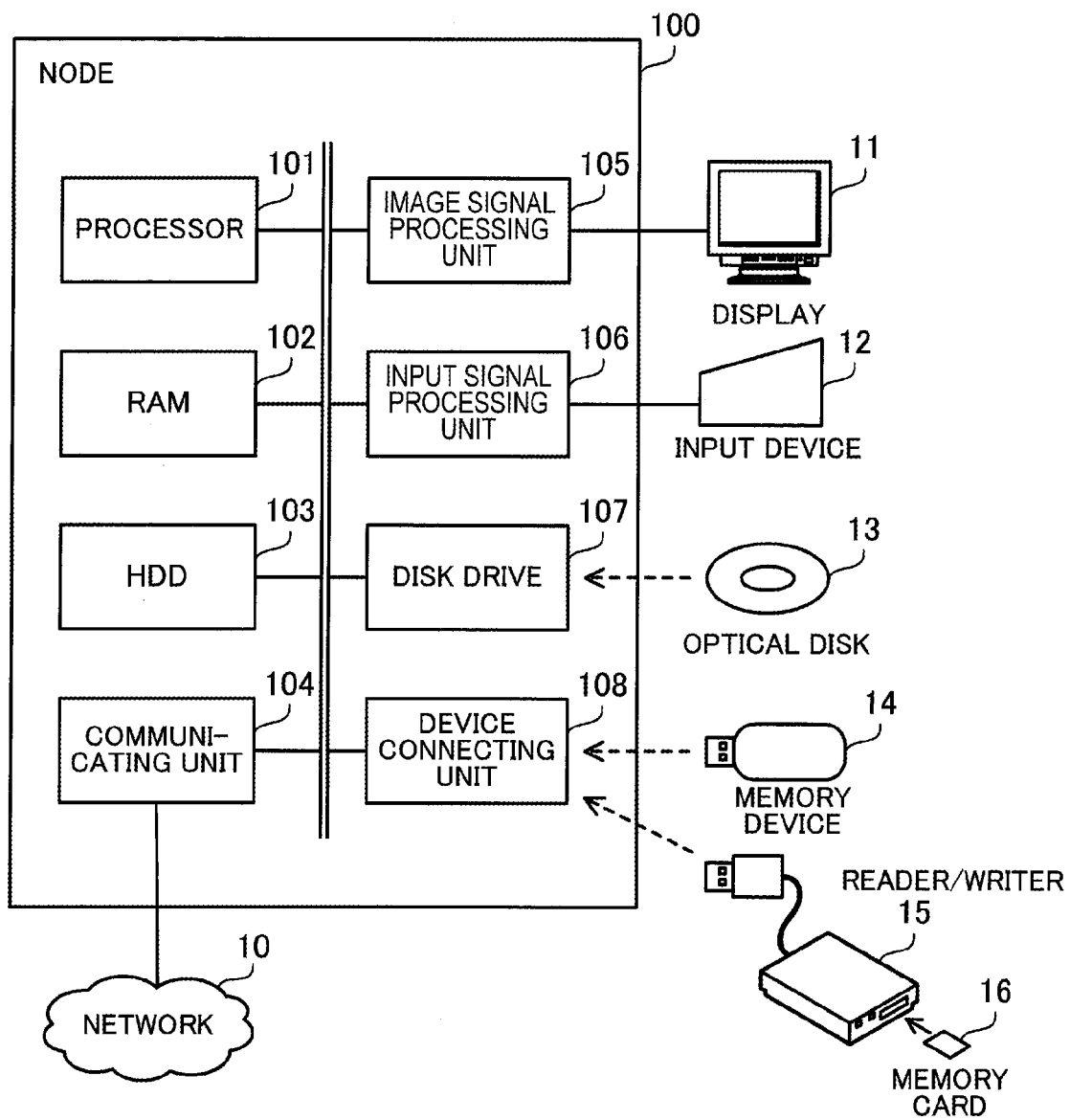
FIG. 3 illustrates an example of a hardware configuration of a node.

FIG. 3 illustrates an example of a hardware configuration of a node. The node 100 includes a processor 101, RAM 102, a HDD 103, a communicating unit 104, an image signal processing unit 105, an input signal processing unit 106, a disk drive 107, and a device connecting unit 108. The individual units are connected to a bus of the node 100. Each of the nodes 200 and 300 and the management node 400 may be built with the same hardware units as the node 100.

The processor 101 controls information processing of the node 100. The processor 101 may be a multiprocessor. The processor 101 is, for example, a CPU, a DSP, an ASIC, a FPGA, or any combination of two or more of the above.

The RAM 102 is a main storage device of the node 100. The RAM 102 temporarily stores at least part of an operating system (OS) program and application programs to be executed by the processor 101. The RAM 102 also stores therein various types of data to be used by the processor 101 for its processing.

The HDD 103 is used as a secondary storage device of the node 100, and magnetically writes and reads data to and from a built-in disk. The HDD 103 stores therein the OS program, application programs, and various types of data. Note that the node 100 may be equipped with a different type of secondary storage device, such as flash memory and a solid state drive (SSD), or may be equipped with two or more secondary storage devices.

The communicating unit 104 is an interface for communicating with other computers via the network 10. The communicating unit 104 may be a wired or wireless interface.

The image signal processing unit 105 outputs an image to a display 11 connected to the node 100 according to an instruction from the processor 101. A cathode ray tube (CRT) display or a liquid crystal display, for example, may be used as the monitor 11.

The input signal processing unit 106 acquires an input signal from an input device 12 connected to the node 100 and outputs the signal to the processor 101. A pointing device such as a mouse and a touch panel, or a keyboard, for example, may be used as the input device 12.

The disk drive 107 is a drive unit for reading programs and data recorded on an optical disk 13 using, for example, laser light. Examples of the optical disk 13 include a digital versatile disc (DVD), a DVD-RAM, a compact disk read only memory (CD-ROM), a CD recordable (CD-R), and a CD-rewritable (CD-RW). The disk drive 107 stores programs and data read from the optical disk 13 in the RAM 102 or the HDD 103 according to an instruction from the processor 101.

The device connecting unit 108 is a communication interface for connecting peripherals to the node 100. To the device connecting unit 108, for example, a memory device 14 and a reader/writer 15 may be connected. The memory device 14 is a storage medium having a function for communicating with the device connecting unit 108. The reader/writer 15 is a device for writing and reading data to and from a memory card 16 which is a card type storage medium. The device connecting unit 108 stores programs and data read from the memory device 14 or the memory card 16 in the RAM 102 or the HDD 103, for example, according to an instruction from the processor 101.

Figure 4:
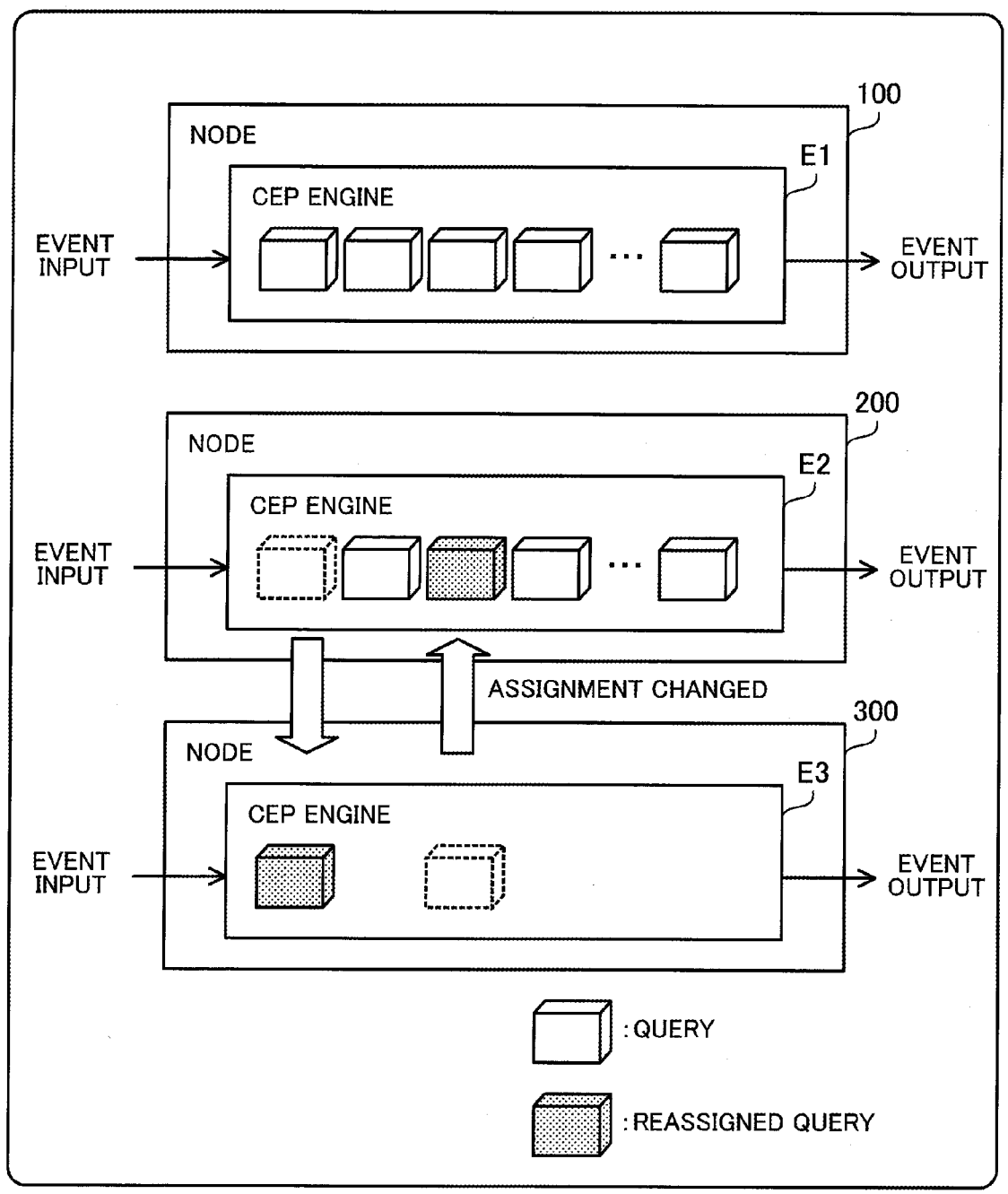
FIG. 4 illustrates an example of changes in query assignment.

FIG. 4 illustrates an example of changes in query assignment. The nodes 100, 200, and 300 include CEP engines E1, E2, and E3, respectively. The CEP engines E1, E2, and E3 execute CEP. For example, each of the CEP engines E1, E2, and E3 is implemented by the processor of the corresponding node executing a program stored in the RAM of the node. Alternatively, each of the CEP engines E1, E2, and E3 may be implemented by dedicated hardware provided in the corresponding node.

For example, an event corresponding to a query assigned to the node 100 is input to the CEP engine E1. The CEP engine E1 generates a new event as a result of the query and outputs the new event. The output event is transmitted to a different node or an apparatus of various types connected to the network 20. Herewith, the CEP engine E1 causes the different node to execute different event processing, or controls the apparatus connected to the network 20. The CEP engines E2 and E3 operate in the same manner as the CEP engine E1.

The management node 400 monitors the processing load of the nodes 100, 200, and 300. Assume for example that the processing load of the node 200 is higher than that of the node 100 and the processing load of the node 300 is lower than that of the node 100. In this case, the management node 400 determines to reassign, to the node 300, a query having been assigned to the node 200. This decreases the processing load of the node 200 and also balances the processing load among the nodes 100, 200, and 300. When the processing load of the node 300 has relatively increased and the processing load of the node 200 has been relatively reduced, the management node 400 may determine to reassign, to the node 200, a query having been assigned to the node 300.

The management node 400 instructs the determined assignment change to the nodes 100, 200, and 300. According to the instruction, each of the nodes 100, 200, and 300 makes a change to the query assignment. For example, in the case where a query is reassigned from the node 200 to the node 300, the nodes 100, 200, and 300 update information regarding a node in charge of the query to the node 300. Thus, the second embodiment provides such a scalable system. For example, the second embodiment enables the query assignment to flexibly respond to an addition or deletion of a node.

Each query has a state (query state) associated with an arrival situation of a plurality of events. According to the second embodiment, the query state is maintained before and after a change to the query assignment. Specifically, an originally assigned node provides a newly assigned node with the query state of a reassigned query, to thereby pass over the execution of the query to the newly assigned node. Note here that the query state is an example of the progress information of the first embodiment.

Figure 5:
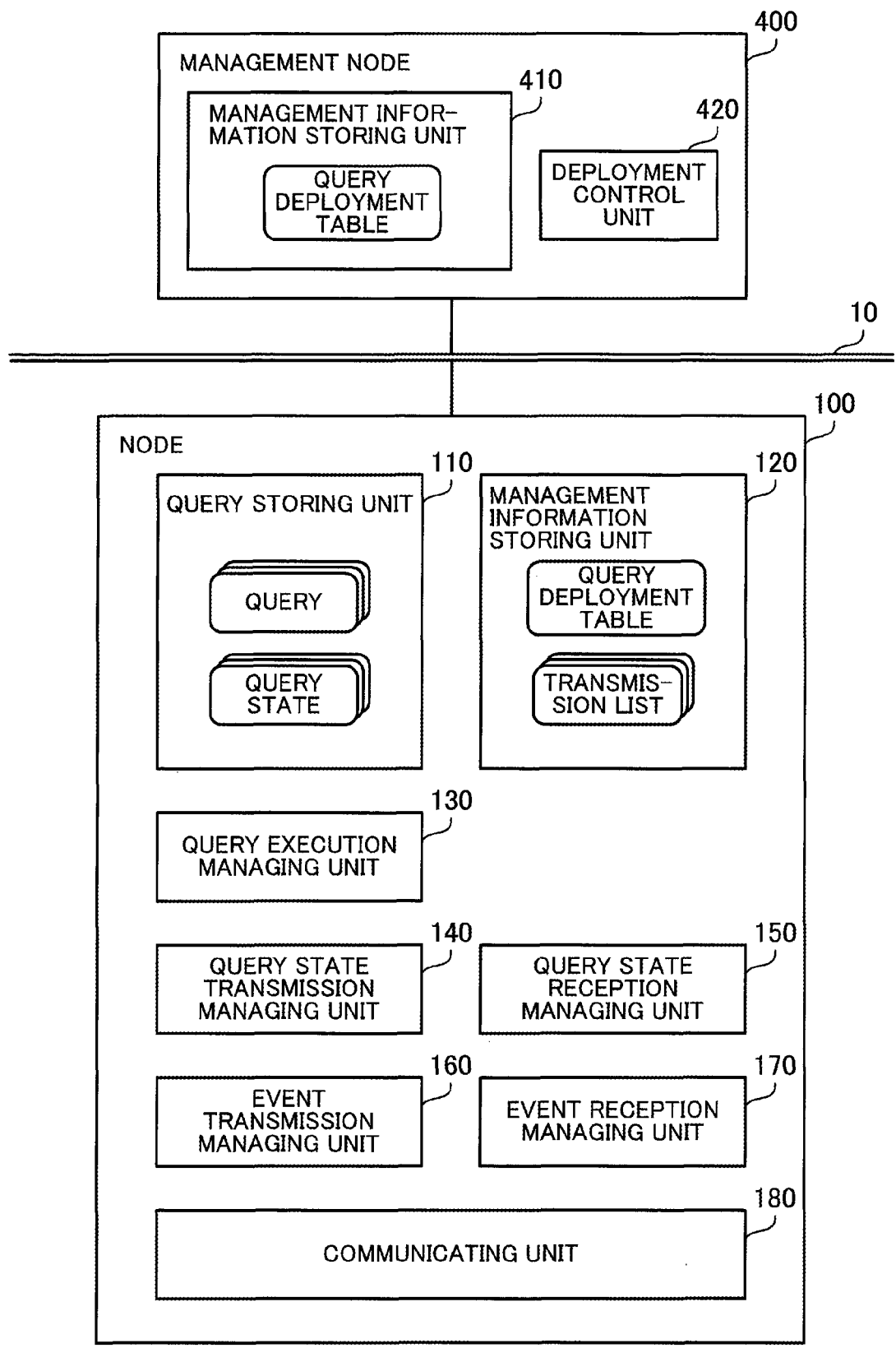
FIG. 5 illustrates an example of a software configuration of the distributed processing system.

FIG. 5 illustrates an example of a software configuration of a distributed processing system. The node 100 includes a query storing unit 110, a management information storing unit 120, a query execution managing unit 130, a query state transmission managing unit 140, a query state reception managing unit 150, an event transmission managing unit 160, an event reception managing unit 170, and a communicating unit 180. The query storing unit 110 and the management information storing unit 120 may be implemented using part of the storage area of the RAM 102 or the HDD 103. The query execution managing unit 130, the query state transmission managing unit 140, the query state reception managing unit 150, the event transmission managing unit 160, the event reception managing unit 170, and the communicating unit 180 may be implemented as modules of software executed by the processor 101. Alternatively, the individual units may be part of functions of the CEP engine E1 (the same applies to the nodes 200 and 300).

The query storing unit 110 stores queries and their query states. The query storing unit 110 prestores all queries to be used in the distributed processing system. The query storing unit 110 also stores the current query state of each of the queries. The query storing unit 110 prestores information about the correspondence between stream names included in individual events and identification information of queries (query names) for processing the events.

The management information storing unit 120 stores a query deployment table and transmission lists. The query deployment table represents query assignment to each node, and also indicates the correspondence between queries and the current query state of each of the queries. The transmission lists are containers each storing therein data to be transmitted. One transmission list is prepared for each destination.

The query execution managing unit 130 manages the execution of a query corresponding to an input event. With the execution of the query, the query execution managing unit 130 updates the query state of the query, stored in the query storing unit 110.

The query state transmission managing unit 140 receives, from the management node 400, a reassignment instruction indicating reassignment of a query having been assigned to its own node (i.e., the node 100 in this case) to a different node. In response, the query state transmission managing unit 140 acquires the query state of the query from the query storing unit 110. The query state transmission managing unit 140 serializes the acquired query state and then adds the serialized query state to a transmission list to be sent to the destination node. The serialization is the process of converting information into a data format transmittable over the network 10. The query state transmission managing unit 140 continues buffering the transmission list until the data size of the transmission list reaches a predetermined data size, and then transmits data included in the transmission list to the destination node.

The query state reception managing unit 150 receives, from a different node, the query state of a query reassigned from the different node to its own node. The query state reception managing unit 150 registers the correspondence between the reassigned query and its query state in the query deployment table stored in the management information storing unit 120. As described later, the query state received by the query state reception managing unit 150 from the different node may include one or more events corresponding to the query. In that case, the query state reception managing unit 150 requests the query execution managing unit 130 to execute the query using the events.

The event transmission managing unit 160 manages event transmission. Specifically, in order to transmit, to a different node, one or more events of a query assigned to the different node, the event transmission managing unit 160 serializes the events and registers the events in a transmission list. The event transmission managing unit 160 transmits the events included in the transmission list to the different node.

The event reception managing unit 170 manages event reception. Specifically, the event reception managing unit 170 carries out processing according to one of the following cases #1 to #4.

Case #1, where an acquired event corresponds to a query assigned to its own node. In this case, the event reception managing unit 170 requests the query execution managing unit 130 to execute the query using the event.

Case #2, where an acquired event corresponds to a query reassigned from its own node to a different node, and the query state of the query is managed to indicate the query being in transit from its own node to the different node. In this case, the event reception managing unit 170 adds the event to a transmission list of the query state.

Case #3, where an acquired event corresponds to a query reassigned from a different node to its own node, and the query state of the query is managed to indicate the query being in transit from the different node to its own node. In this case, the event reception managing unit 170 registers the event in the query deployment table stored in the management information storing unit 120, as a wait event for the query.

Case #4, where an acquired event corresponds to a query assigned to a different node. In this case, the event reception managing unit 170 transfers the event to the different node.

The event reception managing unit 170 determines the above Cases #1 to #4 based on the query deployment table stored in the management information storing unit 120. Note that in Cases #2 and #3, the time frame during which the query state is managed to indicate 'the query being in transit' includes a preparation period for sending out the query state onto the network (a transmission preparation period for serialization, buffering, and the like).

The communicating unit 180 communicates with the nodes 200 and 300, the management node 400, and various apparatuses connected to the network 20. The above-described data transmission and reception between a different apparatus and the individual query state transmission managing unit 140, query state reception managing unit 150, event transmission managing unit 160, and event reception managing unit 170 are performed via the communicating unit 180.

The management node 400 includes a management information storing unit 410 and a deployment control unit 420. The management information storing unit 410 may be implemented using part of the storage area of RAM or a HDD of the management node 400. The deployment control unit 420 may be implemented as a module of software executed by a processor of the management node 400.

The management information storing unit 410 stores the query deployment table. The deployment control unit 420 monitors processing load of the nodes 100, 200, and 300. The deployment control unit 420 makes a change to query assignment of each of the nodes 100, 200, and 300 according to the processing load of each node, to thereby balance the processing load among the nodes 100, 200, and 300. With the change to the query assignment, the deployment control unit 420 updates the query deployment table stored in the management information storing unit 410.

When making a change to the query assignment, the deployment control unit 420 instructs all the nodes 100, 200, and 300 the query reassignment. The instruction includes a reassigned query and identification information of an originally assigned node and a newly assigned node. The instruction also includes an instruction to update the query deployment table held by each node. This query reassignment instruction may be input by a user through a predetermined input device connected to the management node 400. In that case, the management node 400 instructs each node to make a change to the query assignment in response to the operation input from the user.

Figure 6:
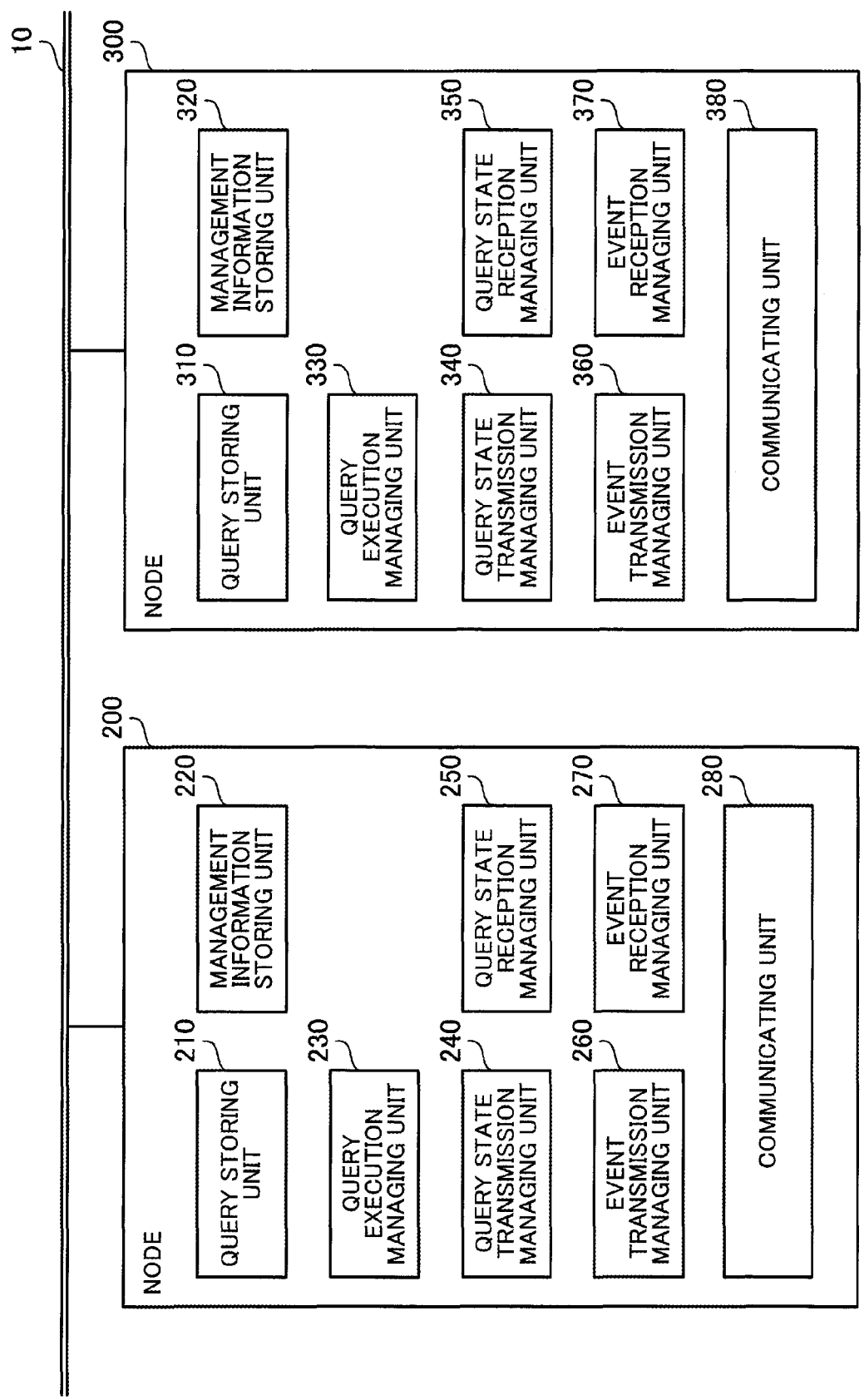
FIG. 6 illustrates the example of the software configuration of the distributed processing system (continued from FIG. 5)

FIG. 6 illustrates the example of the software configuration of the distributed processing system (continued from FIG. 5). The node 200 includes a query storing unit 210, a management information storing unit 220, a query execution managing unit 230, a query state transmission managing unit 240, a query state reception managing unit 250, an event transmission managing unit 260, an event reception managing unit 270, and a communicating unit 280.

The node 300 includes a query storing unit 310, a management information storing unit 320, a query execution managing unit 330, a query state transmission managing unit 340, a query state reception managing unit 350, an event transmission managing unit 360, an event reception managing unit 370, and a communicating unit 380.

The query storing units 210 and 310 and the management information storing units 220 and 320 may be implemented using part of the storage area of RAM or HDDs of the nodes 200 and 300, respectively. The query execution managing units 230 and 330, the query state transmission managing units 240 and 340, the query state reception managing units 250 and 350, the event transmission managing units 260 and 360, the event reception managing units 270 and 370, and the communicating units 280 and 380 may be implemented as modules of software executed by processors of the nodes 200 and 300, respectively. Since each of the functions of the nodes 200 and 300 is the same as the counterpart with the same name of the node 100, the explanation will be omitted.

FIG. 7 illustrates an example of an event. Event X illustrates the format of an event. Event X includes items of event type, stream name, and content. For the event type item, the type of an event is registered. For the stream name item, the identification information of a stream corresponding to the event is registered. For the content item, the information indicating content of the event is registered.

Event X1 is an example of Event X. For example, Event X1 stores information with the event type being 'P', the stream name being 'InputStream', and the content being '1000 W'. This information indicates that the type of Event X1 is 'P' representing information regarding electric power, the stream name corresponding to Event X1 is 'InputStream', and the content of Event X1 is detection of a power consumption of '1000 W'.

FIG. 8 illustrates an example of a query. A query 111 is stored in the query storing unit 110. The query 111 is a description example of a query in Event Processing Language (EPL) called Esper. The query 111 defines that data (an event) is output to a data stream if events are input in the order of three streams, A→B→C. Thus, each query is able to define a condition for various events. In the following description, an event with a stream name 'A' may be denoted as Event A.

Figure 9:
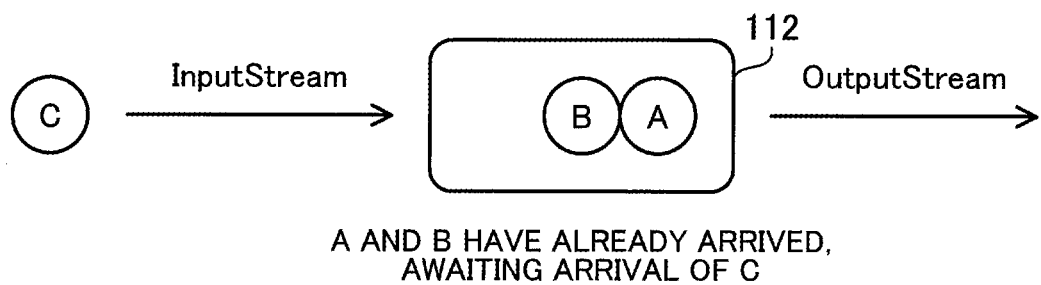
FIG. 9 illustrates an example of a query state.

FIG. 9 illustrates an example of a query state. A query state 112 is an example of the query state of the query 111. The query state 112 is stored in the query storing unit 110. The query state 112 represents that, as for the query 111, Events A and B have already arrived but Event C has yet to arrive (i.e., a state awaiting arrival of Event C). The nodes 100, 200, and 300 hold the current query state of each query. The correspondence between each query and its query state is managed by the query deployment table held by each of the nodes 100, 200, and 300.

FIG. 10 illustrates a first example of a query deployment table. A query deployment table 121 is stored in the management information storing unit 120. According to the example of FIG. 10, the query deployment table 121 is in a table form, however, a different data structure may be used instead. For example, the query deployment table 121 may be a HashMap using the query name as a key. The query deployment table 121 includes columns named query name, assigned node name, status, reference to query state, lock, and wait event.

In the query name column, each field contains the identification information of a query. In the assigned node name column, each field contains the name of a node (node in charge) to which a corresponding query has been assigned (disposed). In the status column, each field contains the current status of a corresponding query.

The following are possible status of each query: (1) being in operation (the query is executable in the node in charge); (2) being migrated to a different node (the query state is being transmitted from an originally assigned node to a newly assigned node in response to a change to query assignment); and (3) having already been migrated to a different node (transmission of the query state from an originally assigned node to a newly assigned node has been completed).

In the reference to query state column, each field contains the pointer to the query state of a corresponding query. Note however that, in the case where the query state is not managed in its own node, the term 'absent in node' is registered.

In the lock column, each field contains information indicating whether the query state of a corresponding query is locked. In the wait event column, each field contains a wait event for a corresponding query. The wait event is an event that its own node has acquired for the query reassigned to its own node before completion of transmission of the query state of the query from an originally assigned node to its own node.

For example, the following information is registered in the query deployment table 121: the query name being 'Query1', the assigned node name being 'node 100', the status being 'being migrated to Node 200', the reference to query state being '&Query1State', the lock being 'unlocked', and the wait event being 'null'. This information indicates that a query identified by 'Query1' is currently assigned to the node 100, and that the assignment of the query is undergoing a change from the node 100 to the node 200. The information also indicates that the query state of the query is pointed to by the pointer '&Query1State', the query state is not locked, and there is no wait event for the query.

FIG. 11 illustrates a second example of the query deployment table. A query deployment table 221 is stored in the management information storing unit 220. FIG. 11 illustrates registration content of the query deployment table 221, obtained at the same point in time as the query deployment table 121 above. The query deployment table 221 includes the same column items as the query deployment table 121, and their explanation is therefore omitted.

For example, the query deployment table 221 differs from the query deployment table 121 in that, as for the query identified by 'Query1', the reference to query state is 'absent in node' and the wait event is 'α5, α6'. This information indicates that the assignment of the query is undergoing a change (the query state is being migrated to the node 200), and its own node (the node 200) does not have the query state. The information also indicates that, for the query, Events α5 and α6 have been acquired as wait events.

In addition, the query deployment table 221 differs from the query deployment table 121 in that, as for a query identified by 'Query8', the reference to query state is '&Query8State'. This is because the node 200 is in charge of the query and therefore holds the query state of the query.

FIG. 12 illustrates a third example of the query deployment table. A query deployment table 321 is stored in the management information storing unit 320. FIG. 12 illustrates registration content of the query deployment table 321, obtained at the same point in time as the query deployment tables 121 and 221 above. The query deployment table 321 includes the same column items as the query deployment table 121, and their explanation is therefore omitted.

For example, the query deployment table 321 differs from the query deployment tables 121 and 221 in that, as for the query identified by 'Query1', the assigned node name is 'node 200' and the status is 'in operation'. This is because the node 300 plays no role in the transmission and reception of the query state associated with the change made to the assignment of the query with the query name of 'Query1'. That is, upon receiving a query reassignment instruction from the management node 400, each node may immediately change a corresponding assigned node name after determining that its own node is not involved in the transmission and reception of the query state associated with the reassignment.

In addition, the query deployment table 321 differs from the query deployment tables 121 and 221 in that, as for a query identified by 'Query10', the reference to query state is '&Query10State'. This is because the node 300 is in charge of the query and therefore holds the query state of the query.

Note that the management node 400 holds a query deployment table similar to the query deployment tables 121, 221, and 321. In the query deployment table of the management node 400, the latest assignment status of individual queries of each node is registered. Note however that the query deployment table held by the management node 400 need not manage the information regarding reference to query state, lock, and wait event.

FIG. 13 illustrates an example of a transmission data management structure. A transmission data management structure D is a structure for storing therein the query state of one query in a transmission list. The data structure illustrated here is one used when the transmission list is a bidirectional list, however, the transmission list does not have to be bidirectional and may be, for example, unidirectional. The transmission data management structure D includes items of Forward, Backward, Query State, and Events.

Forward is a pointer (&SendBufStructure) providing a reference to a subsequent linked transmission data management structure. Backward is a pointer (&SendBufStructure) providing a reference to a preceding linked transmission data management structure. Query State is a pointer (&QueryState) providing a reference to a transmission target query state. Events is a pointer (&Events[ ]) providing a reference to an array storing one or more events.

Figure 14:
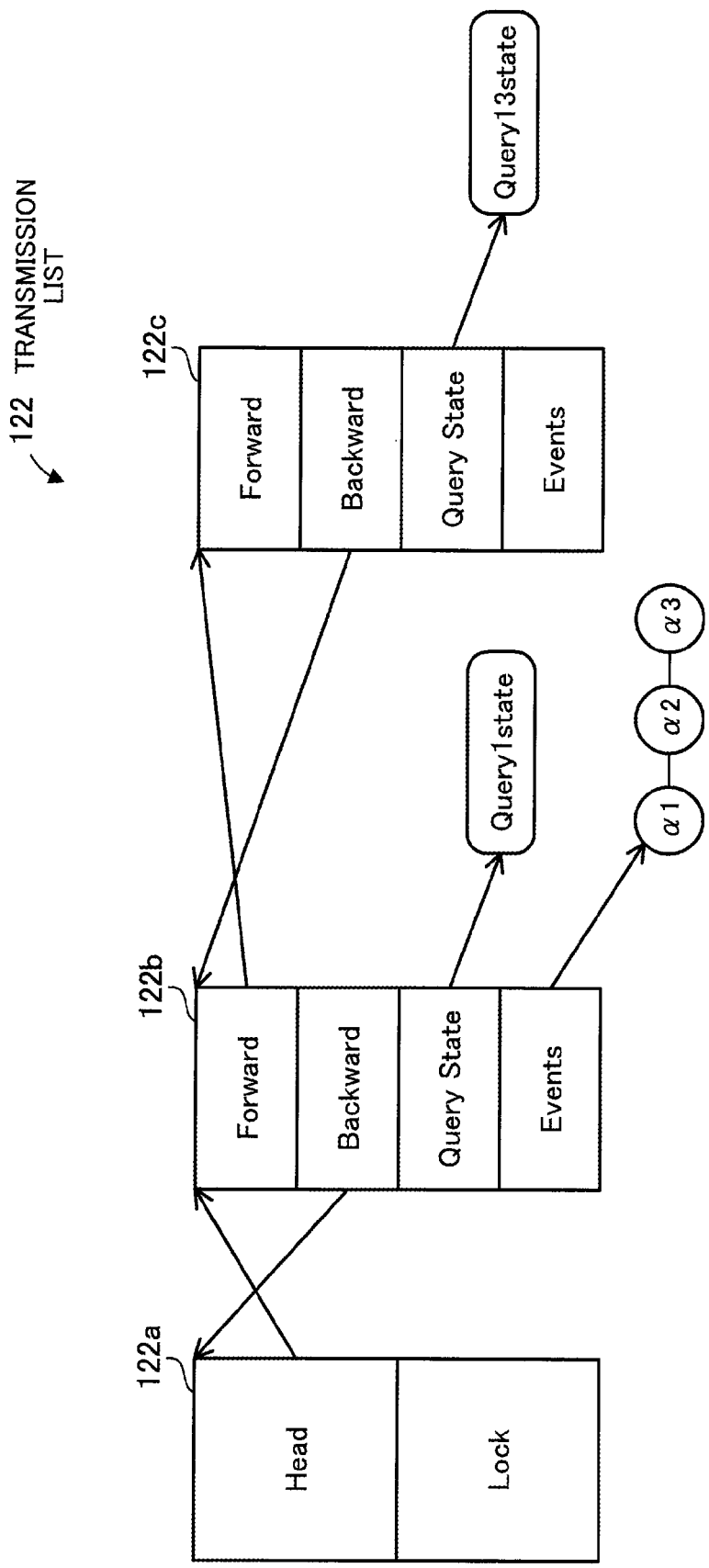
FIG. 14 illustrates an example of a transmission list.

FIG. 14 illustrates an example of a transmission list. A transmission list 122 is stored in the management information storing unit 120 and used to transmit information from the node 100 to the node 200. The transmission list 122 is an example of the transmission data 6 of the first embodiment. Such a transmission list is created for each destination. When information is transmitted from the node 100 to a node other than the node 200, the node 100 creates a different transmission list.

The transmission list 122 is a bidirectional list in which a plurality of transmission data management structures D (hereinafter sometimes referred to as list elements) are linkable. The transmission list 122 includes list elements 122a, 122b, and 122c. The list element 122a is a head (Head) of the transmission list 122. In addition, the list element 122a includes information (a flag, for example) indicating whether the transmission list 122 is locked (the information is set in an item of Lock).

The list element 122b is a list element following the list element 122a. The list element 122c is a list element following the list element 122b. The list elements 122b and 122c individually include items of Forward, Backward, Query State, and Events. The specific set contents are described below.

As for the list element 122b, the following information is set in the individual items. A pointer providing a link to the list element 122c (Forward link) is set in Forward. A pointer providing a link to the list element 122a (Backward link) is set in Backward. A pointer providing a reference to a query state (Query1State) of a query identified by 'Query1' is set in Query State. The query state also includes information indicating that it is the query state of the query identified by 'Query1'. A pointer providing a reference to an array of events ([α1, α2, α3]) having been received for the query is set in Events.

As for the list element 122c, the following information is set in the individual items. Because no subsequent list element is present, nothing (null) is set in Forward. A pointer providing a link to the list element 122b is set in Backward. A pointer providing a reference to a query state (Query13State) of a query identified by 'Query13' is set in Query State. The query state also includes information indicating that it is the query state of the query identified by 'Query13'. Because there is no event received for the query, nothing (null) is set in Events.

Next described are processing procedures carried out when a change is made to query assignment according to the second embodiment. Assume in the following description that a query is reassigned from the node 100 to the node 200. Note, however, that similar procedures take place when a query is reassigned between other nodes.

Figure 15:
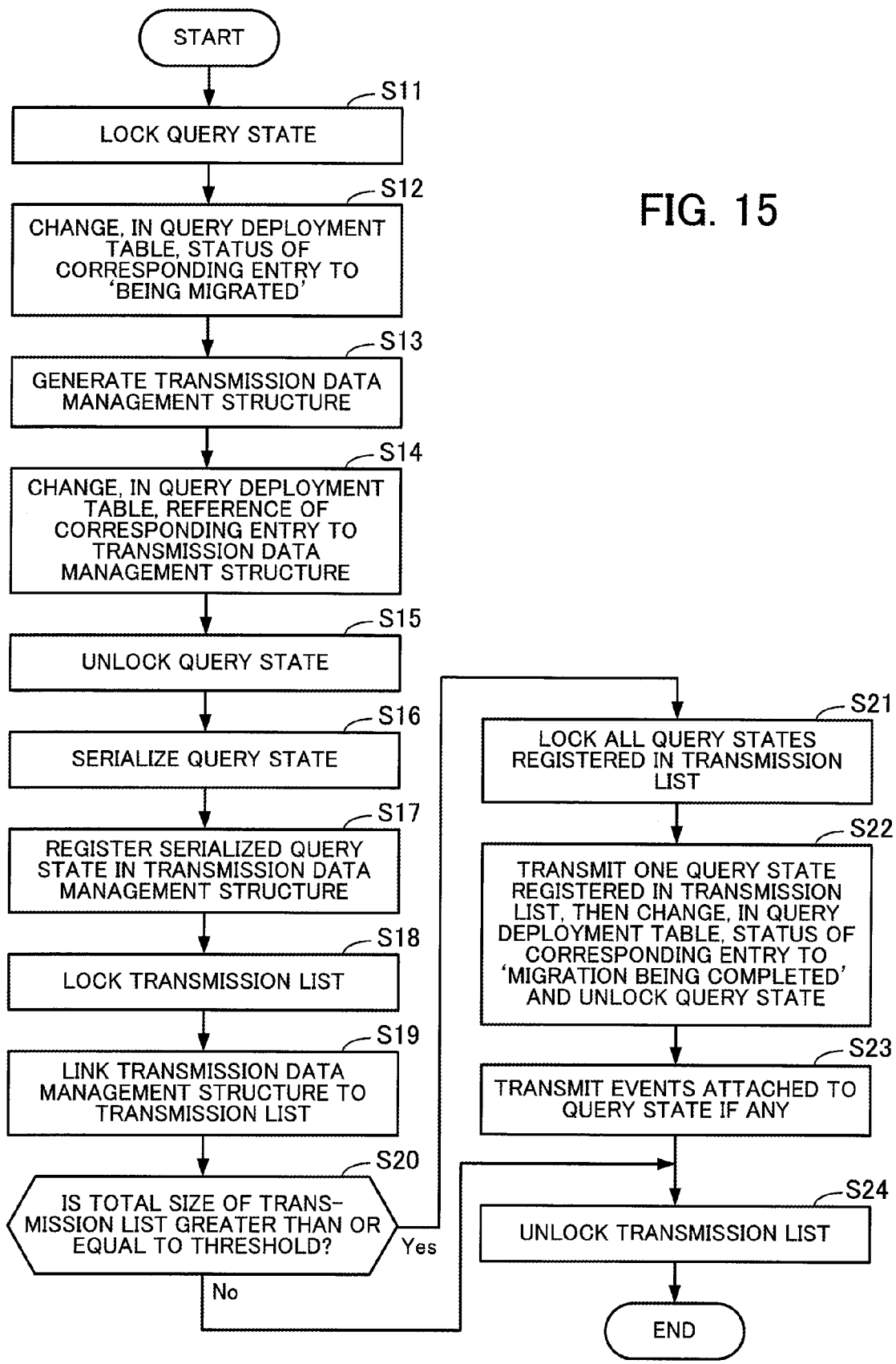
FIG. 15 is a flowchart illustrating an example of query state transmission management.

FIG. 15 is a flowchart illustrating an example of query state transmission management. The process of FIG. 15 is described next according to the step numbers in the flowchart. The following procedure is performed by the node 100 in the case where a query is reassigned from the node 100 to the node 200.

(Step S11) From the management node 400, the query state transmission managing unit 140 receives an instruction to reassign, to the node 200, a query having been assigned to the node 100 (for example, the query with the query name 'Query1'). The query state transmission managing unit 140 manipulates the query deployment table 121 to lock the query state of the reassignment target query ('unlocked' in the lock column of an entry corresponding to the query is changed to 'locked').

(Step S12) The query state transmission managing unit 140 manipulates the query deployment table 121 to change 'in operation' in the status column of the entry corresponding to the query to 'being migrated to node 200' (the newly assigned node 200 also makes the same setting change in its query deployment table 221). From this point forward, the execution of the query is interrupted until the reassignment is completed and the execution of the query is then resumed at the node 200.

(Step S13) The query state transmission managing unit 140 generates the transmission data management structure D.

(Step S14) Referring to the query deployment table 121, the query state transmission managing unit 140 acquires a query state using a pointer set in the reference to query state column of the entry corresponding to the query. The query state transmission managing unit 140 manipulates the query deployment table 121 to change the information in the reference to query state column of the entry to a pointer to the transmission data management structure D generated in FIG. 13.

(Step S15) The query state transmission managing unit 140 manipulates the query deployment table 121 to unlock the query state of the reassignment target query ('locked' in the lock column of the entry is changed to 'unlocked').

(Step S16) The query state transmission managing unit 140 serializes the query state acquired in step S14.

(Step S17) The query state transmission managing unit 140 registers the serialized query state in the transmission data management structure D generated in step S13. Specifically, the query state transmission managing unit 140 registers a pointer to the query state in the transmission data management structure D.

(Step S18) The query state transmission managing unit 140 locks the transmission list 122.

(Step S19) The query state transmission managing unit 140 links the transmission data management structure D (with the query state registered) to the transmission list 122.

(Step S20) The query state transmission managing unit 140 determines whether the total data size of the transmission list 122 is greater than or equal to a threshold. If the total data size is greater than or equal to the threshold, the query state transmission managing unit 140 moves the procedure to step S21. If the total data size is less than the threshold, the query state transmission managing unit 140 moves the procedure to step S24. Note that the threshold may be set, for example, by a user to a value according to the communication environment.

(Step S21) The query state transmission managing unit 140 manipulates the query deployment table 121 to lock all query states registered in the transmission list 122. Here, the query states registered in the transmission list 122 are those of individual entries with 'being migrated to node 200' set in the status column in the query deployment table 121.

(Step S22) The query state transmission managing unit 140 sends out one of the query states registered in the transmission list 122 to the node 200 through the network 10. The query state transmission managing unit 140 manipulates the query deployment table 121 to make the following changes for an entry corresponding to the query state sent out: information in the assigned node name column is changed (from 'node 100') to 'node 200'; information in the status column is changed to 'migration being completed'; and information in the reference to query state column is changed to 'absent in node'. Subsequently, the query state transmission managing unit 140 manipulates the query deployment table 121 to unlock the query state of the entry.

(Step S23) If, in the transmission list 122, one or more events are attached to the query state transmitted in step S22, the managing unit 140 also transmits the events to the node 200. Note that steps S22 and S23 are executed for each of the query states registered in the transmission list 122. In the case where there are a plurality of query states registered in the transmission list 122, the query state transmission managing unit 140 repeats steps S22 and S23 for each of the query states.

(Step S24) The query state transmission managing unit 140 unlocks the transmission list 122.

As described above, if the transmission list 122 includes events associated with a reassigned target query, the node 100 transmits the events to the node 200 together with the query state of the query.

Subsequently, for example, the query state transmission managing unit 140 receives notification of completion of the query reassignment from the management node 400. Upon receiving the notification, for example, the query state transmission managing unit 140 changes, in the query deployment table 121, information in the status column of an entry corresponding to the query (from 'migration being completed') to 'in operation'.

In step S12, the node 300 playing no role in the transmission and reception of the query state may change, in the query deployment table 321, information in the assigned node name column of an entry corresponding to the query to 'node 200' in response to the instruction in step S11, as described above. Similarly, the management node 400 may change, in its own query deployment table, information in the assigned node name column of an entry corresponding to the query to 'node 200' when issuing the query reassignment instruction.

Figure 16:
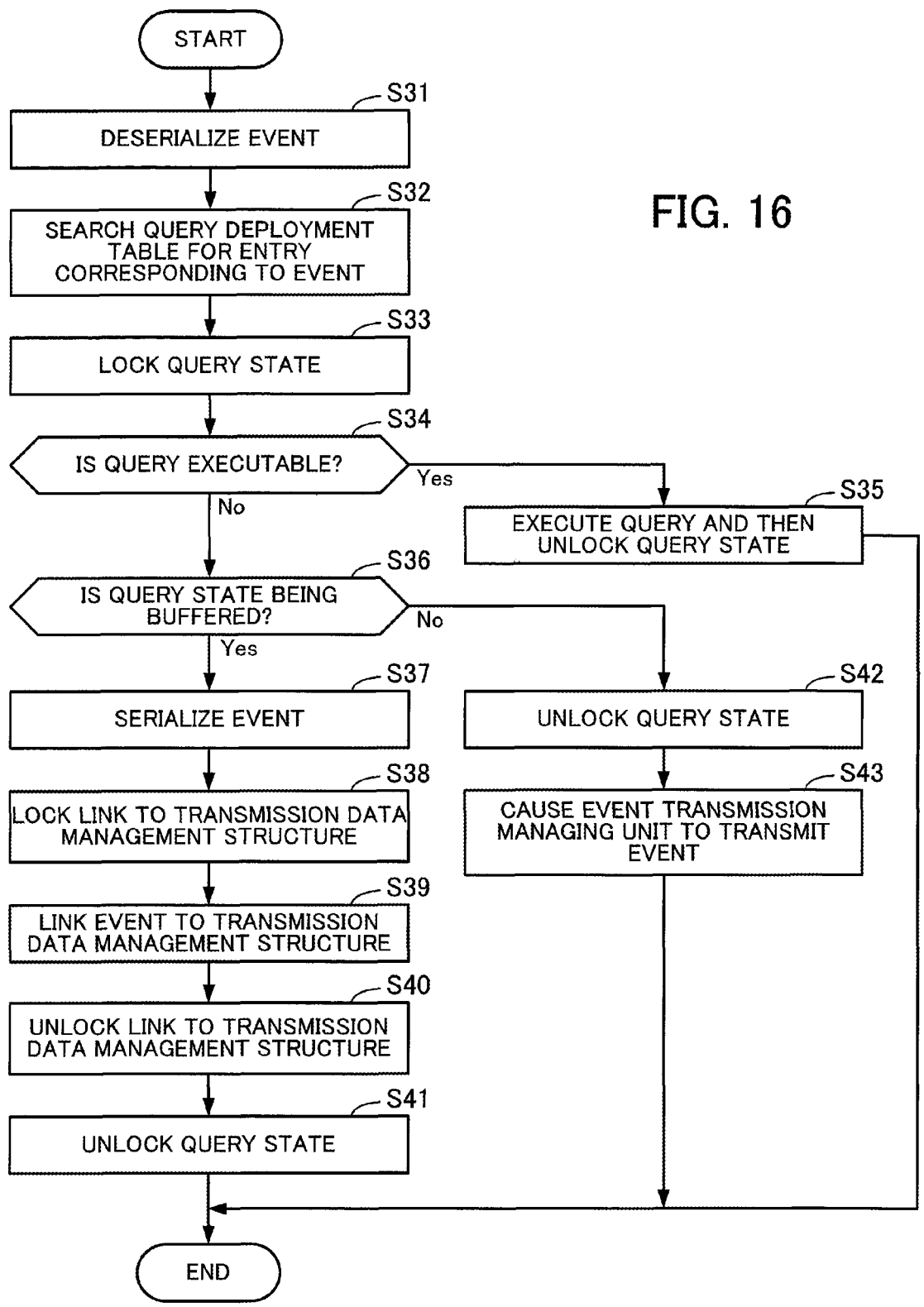
FIG. 16 is a flowchart illustrating an example of event reception management (at an originally assigned node)

FIG. 16 is a flowchart illustrating an example of event reception management (at an originally assigned node). The process of FIG. 16 is described next according to the step numbers in the flowchart. FIG. 16 illustrates the case of the node 100 as an example, however, other nodes follow a similar procedure.

(Step S31) The event reception managing unit 170 acquires an event. A source having issued the event may be an apparatus connected to the network 20 or one of the nodes 100, 200, and 300. The event reception managing unit 170 deserializes the acquired event (no deserialization may take place in the case where the event issuing source is the node 100).

(Step S32) The event reception managing unit 170 acquires identification information of a query (query name) from a stream name included in the event. The query storing unit 110 stores therein information about the correspondence between each stream name and the query name of a query for processing an event including the stream name. Therefore, by referring to the information, the event reception managing unit 170 is able to acquire the query name based on the stream name. The event reception managing unit 170 searches the query deployment table 121 for an entry corresponding to the event, using the query name as a key.

(Step S33) The event reception managing unit 170 manipulates the query deployment table 121 to lock the query state of the entry.

(Step S34) Referring to the query deployment table 121, the event reception managing unit 170 determines whether the query of the entry is executable. If the query is executable, the event reception managing unit 170 moves the procedure to step S35. If not, the event reception managing unit 170 moves the procedure to step S36. The query is executable when its own node is in charge of the query and the status is 'in operation'. On the other hand, the query is not executable when its own node is not in charge of the query, or when the status is not 'in operation' even if its own node is in charge of the query.

(Step S35) The query execution managing unit 130 executes the query using the acquired event and then changes the query state of the query according to the execution result. The query execution managing unit 130 manipulates the query deployment table 121 to unlock the query state of the query. Subsequently, the query execution managing unit 130 ends the procedure.

(Step S36) Referring to the query deployment table 121, the event reception managing unit 170 determines whether the query state of the query corresponding to the acquired event is being buffered. In the case where the query state is being buffered, the event reception managing unit 170 moves the process to step S37. If the query state is not being buffered, the event reception managing unit 170 moves the process to step S42. Whether the query state is being buffered is determined by referring to information in the status column of the entry corresponding to the query in the query deployment table 121. If its own node is in charge of the query and the status is 'being migrated to different node (the node 200, for example)', the query state is being buffered. If the status is other than 'being migrated to different node', the query state is not being buffered.

(Step S37) The event reception managing unit 170 serializes the acquired event.

(Step S38) The event reception managing unit 170 locks, in the transmission list, a link to a transmission data management structure D (list element) in which the query state of a query corresponding to the event is registered.

(Step S39) The event reception managing unit 170 registers the acquired event in the transmission data management structure D (event link-up).

(Step S40) The event reception managing unit 170 unlocks the link to the transmission data management structure D.

(Step S41) The event reception managing unit 170 manipulates the query deployment table 121 to unlock the query state of the query, and then ends the procedure.

(Step S42) The event reception managing unit 170 manipulates the query deployment table 121 to unlock the query state of the query.

(Step S43) The event reception managing unit 170 causes the event transmission managing unit 160 to transmit the acquired event. The process carried out by the event transmission managing unit 160 is described in detail later.

As described above, when the event reception managing unit 170 acquires an event, if the query state of a query for processing the event is being in transit, the event reception managing unit 170 registers the event in a list element storing the query state, in the transmission list (steps S37 to S40). In this regard, the above-described processes of creating the transmission list by the query state transmission managing unit 140 and the event reception managing unit 170 may be achieved at low cost by using an application programming interface (API) called 'gather', for example.

In addition, if the event is associated with a query assigned to its own node and then the query state is not being in transit, the query is executed as usual (step S35). Furthermore, when the acquired event is associated with a query assigned to a different node, the event is transmitted to the different node by the event transmission managing unit 160 (step S43).

Figure 17:
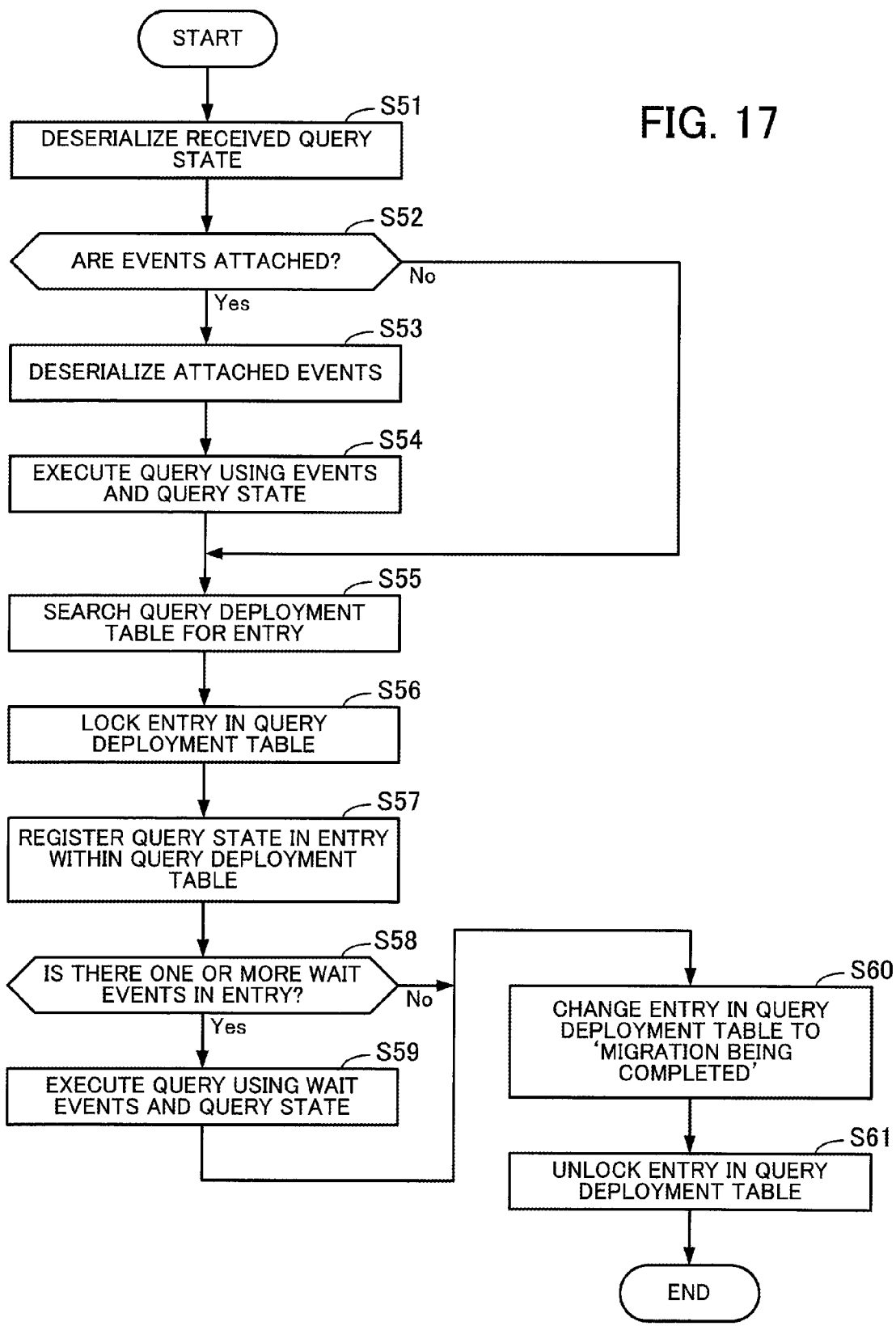
FIG. 17 is a flowchart illustrating an example of query state reception management.

FIG. 17 is a flowchart illustrating an example of query state reception management. The process of FIG. 17 is described next according to the step numbers in the flowchart. The following procedure is performed by the node 200 in the case where a query is reassigned from the node 100 to the node 200. Note that, prior to step S51, the node 200 has received, from the management node 400, a query reassignment instruction indicating that a query is reassigned from the node 100 to the node 200. Upon receiving the query reassignment instruction, the node 200 sets, in the query deployment table 221, the status of a query designated in the query reassignment instruction to 'being migrated to node 200'.

(Step S51) The query state reception managing unit 250 receives the query state of a reassignment target query (for example, the query with the query name 'Query1') from the node 100. The query state reception managing unit 250 deserializes the received query state and stores the query state in the query storing unit 210.

(Step S52) The query state reception managing unit 250 determines whether one or more events are attached to the received query state. If events are attached, the query state reception managing unit 250 moves the procedure to step S53. If not, the query state reception managing unit 250 moves the procedure to step S55.

(Step S53) The query state reception managing unit 250 deserializes the attached events (for example, Events $\alpha 1$, $\alpha 2$, and $\alpha 3$), and outputs the deserialized events to the query execution managing unit 230.

(Step S54) The query execution managing unit 230 executes the query using the acquired events and the query state, and then changes the query state stored in the query storing unit 210.

(Step S55) Referring to the query deployment table 221 stored in the management information storing unit 220, the query state reception managing unit 250 searches for an entry of the query.

(Step S56) The query state reception managing unit 250 locks the entry.

(Step S57) The query state reception managing unit 250 registers, in a field in the reference to query state column of the entry, a pointer to the query state stored in the query storing unit 210. The query state indicated by the pointer is the query state acquired in step S51 in the case where step S54 is not executed. On the other hand, if step S54 has been executed, the query state indicated by the pointer is a query state according to the execution result of step S54.

(Step S58) The query state reception managing unit 250 determines whether there is one or more wait events in the entry. If there is one or more wait events, the query state reception managing unit 250 moves the procedure to step S59. If not, the query state reception managing unit 250 moves the procedure to step S60.

(Step S59) The query execution managing unit 230 executes the query using the wait events (for example, Events $\alpha 5$ and $\alpha 6$) and the current query state, and then changes the query state.

(Step S60) The query state reception managing unit 250 manipulates the query deployment table 221 to make following changes for the entry found in the search of step S55: information in the assigned node name column is changed (from 'node 100') to 'node 200'; and information in the status column is changed to 'migration being completed'.

(Step S61) The query state reception managing unit 250 unlocks the entry.

Thus, if one or more events are attached to a received query state, the query state reception managing unit 250 executes a query using the events and query state and then updates the query state. In addition, if there is one or more wait events for the query, the query state reception managing unit 250 executes the query using the wait events and then updates the query state.

In this regard, it is sometimes the case that an event to be used in the query has occurred before the wait events, but has yet to arrive at the node 200 (to be described later). In this case also, the node 200 is allowed to execute the query using the query state and the wait events.

At some time after step S51, the query state reception managing unit 250 notifies the management node 400 of the appropriate reception of the query state. Then, upon receiving a response to the notification from the management node 400 (i.e., notification of the completion of the query reassignment), for example, the query state reception managing unit 250 changes, in the query deployment table 221, information in the status column of an entry corresponding to the query to 'in operation' (if the status is already 'in operation' prior to step S60, the status need not be changed to 'migration being completed' in step S60).

Figure 18:
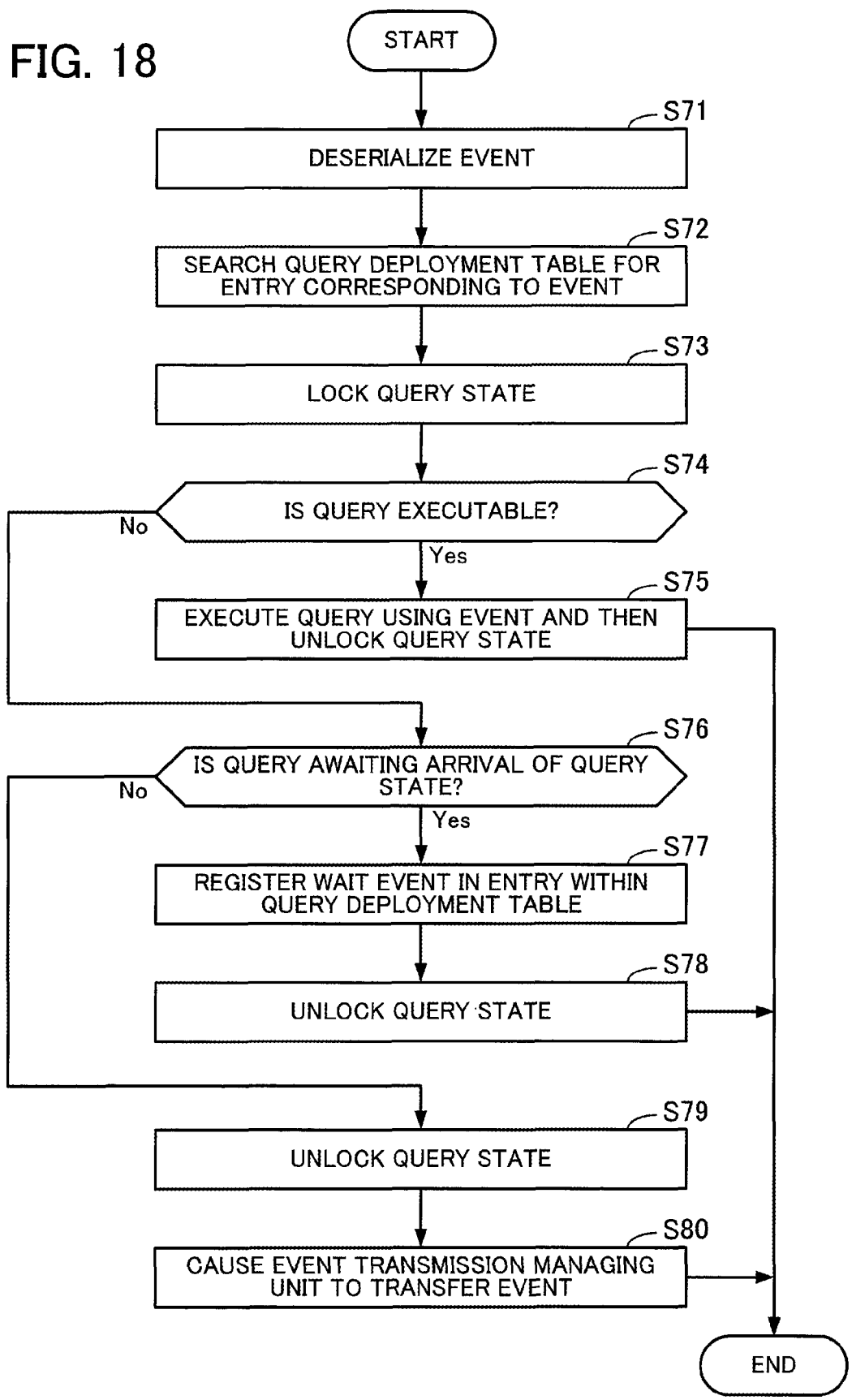
FIG. 18 is a flowchart illustrating an example of event reception management (at a newly assigned node)

FIG. 18 is a flowchart illustrating an example of event reception management (at a newly assigned node). The process of FIG. 18 is described next according to the step numbers in the flowchart. FIG. 18 illustrates the case of the node 200 as an example, however, other nodes follow a similar procedure.

(Step S71) The event reception managing unit 270 acquires an event. A source having issued the event may be an apparatus connected to the network 20 or one of the nodes 100, 200, and 300. The event reception managing unit 270 deserializes the acquired event (no deserialization may take place in the case where the event issuing source is the node 200).

(Step S72) The event reception managing unit 270 acquires identification information of a query (query name) from a stream name included in the event. The query storing unit 210 stores therein information about the correspondence between each stream name and the query name of a query for processing an event including the stream name. Therefore, by referring to the information, the event reception managing unit 270 is able to acquire the query name based on the stream name. The event reception managing unit 270 searches the query deployment table 221 for an entry corresponding to the event, using the query name as a key.

(Step S73) The event reception managing unit 270 manipulates the query deployment table 221 to lock the query state of the entry.

(Step S74) Referring to the query deployment table 221, the event reception managing unit 270 determines whether the query of the entry is executable. If the query is executable, the event reception managing unit 270 moves the procedure to step S75. If not, the event reception managing unit 270 moves the procedure to step S76. The query is executable when its own node is in charge of the query and the status is 'in operation' or 'migration being completed'. On the other hand, the query is not executable when its own node is not in charge of the query, or when the status is neither 'in operation' nor 'migration being completed' even if its own node is in charge of the query.

(Step S75) The query execution managing unit 230 executes the query using the acquired event and then changes the query state of the query, stored in the query storing unit 210. The query execution managing unit 230 manipulates the query deployment table 221 to unlock the query state of the query. Subsequently, the query execution managing unit 230 ends the procedure.

(Step S76) Referring to the query deployment table 221, the event reception managing unit 270 determines whether the query corresponding to the acquired event awaits arrival of the query state. If the query is awaiting arrival of the query state, the event reception managing unit 270 moves the procedure to step S77. If not, the event reception managing unit 270 moves the procedure to step S79. The query is awaiting arrival of the query state when 'being migrated to its own node (the node 200 in this case)' is set in the field in the status column of an entry corresponding to the query state. On the other hand, the query is not awaiting arrival of the query state when information other than 'being migrated to its own node' is set in the aforementioned field.

(Step S77) The event reception managing unit 270 registers the acquired event (for example, Events α5 and α6) in the field of the entry in the wait event column of the query deployment table 221.

(Step S78) The event reception managing unit 270 manipulates the query deployment table 221 to unlock the query state of the entry. Subsequently, the event reception managing unit 270 ends the procedure.

(Step S79) The event reception managing unit 270 manipulates the query deployment table 221 to unlock the query state of the query corresponding to the acquired event.

(Step S80) The event reception managing unit 270 causes the event transmission managing unit 260 to transmit the acquired event.

As described above, when acquiring an event corresponding to a query awaiting arrival of the query state, the event reception managing unit 270 registers, in the query deployment table 221, the event as a wait event (steps S76 and S77). In the case of acquiring an event corresponding to a query assigned to its own node but not awaiting arrival of the query state, the event reception managing unit 270 executes the query as usual (step S75). In the case of acquiring an event corresponding to a query assigned to a different node, the event reception managing unit 270 causes the event transmission managing unit 260 to transmit the event to the different node (step S80).

Next described is a procedure of event transmission management by the individual event transmission managing units 160, 260, and 360. The following description illustrates the procedure performed by the event transmission managing unit 160, however, each of the event transmission managing units 260 and 360 follows a similar procedure.

Figure 19:
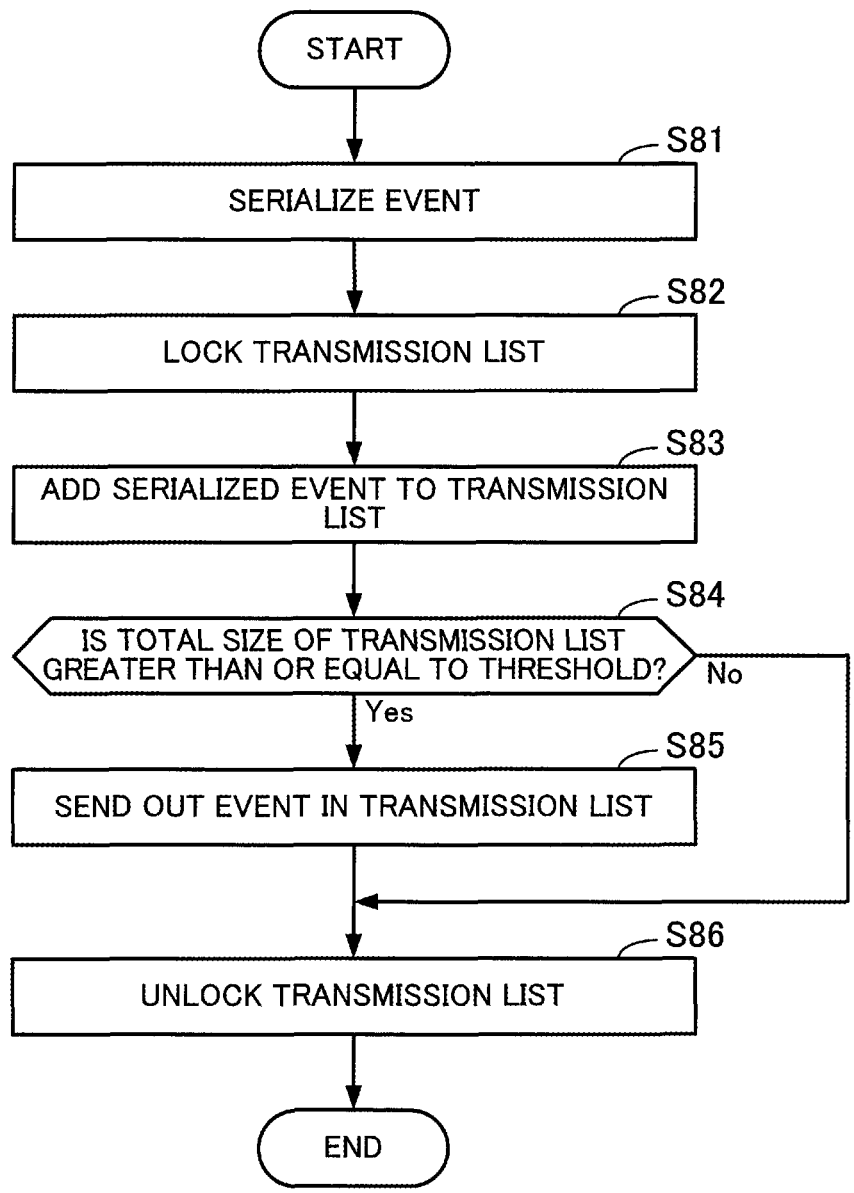
FIG. 19 is a flowchart illustrating an example of event transmission management.

FIG. 19 is a flowchart illustrating an example of event transmission management. The process of FIG. 19 is described next according to the step numbers in the flowchart.

(Step S81) The event transmission managing unit 160 acquires an event. A source having issued the event may be an apparatus connected to the network 20 or one of the nodes 100, 200, and 300. As described above, the event transmission managing unit 160 may acquire, from the event reception managing unit 170, an event corresponding to a query assigned to a different node. The event transmission managing unit 160 serializes the event.

(Step S82) Referring to the query deployment table 121, the event transmission managing unit 160 determines a node to which the event is transmitted. Note that, as in step S32 of FIG. 16 and step S72 of FIG. 18, the event transmission managing unit 160 determines the query name of a query for processing the event based on a stream name included in the event. A node in charge of the query with the query name is the node to which the event is transmitted. The event transmission managing unit 160 locks a transmission list corresponding to the transmission destination node.

(Step S83) The event transmission managing unit 160 adds the serialized event to the transmission list.

(Step S84) The event transmission managing unit 160 determines whether the total data size of the transmission list exceeds or equal to a threshold. If the total data size is greater than or equal to the threshold, the event transmission managing unit 160 moves the procedure to step S85. If the total data size is less than the threshold, the event transmission managing unit 160 moves the procedure to step S86. Note that the threshold may be set, for example, by a user to a value according to the communication environment.

(Step S85) The event transmission managing unit 160 sends out the event in the transmission list to the transmission destination node through the network 10. In this regard, if data of other events is stored in the transmission list, the data is also transmitted.

(Step S86) The event transmission managing unit 160 unlocks the transmission list.

Thus, upon acquiring an event corresponding to a query not assigned to its own node, the event transmission managing unit 160 transmits the event to a node in charge of the query.

Figure 20:
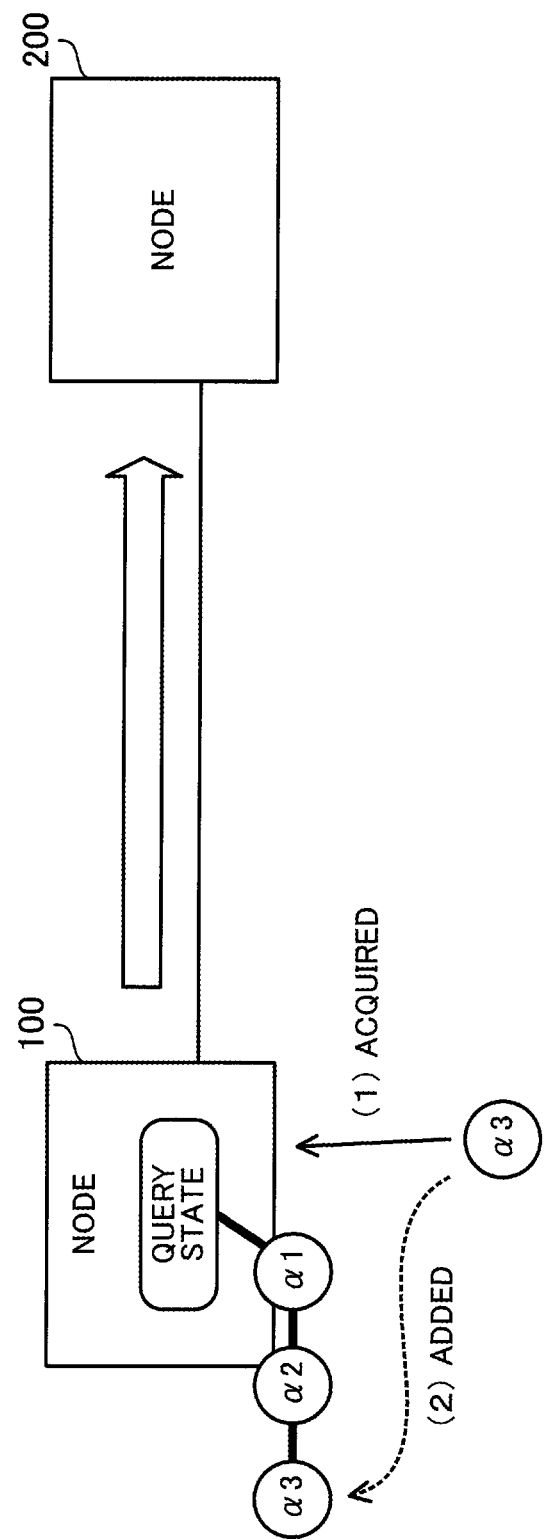
FIG. 20 illustrates a first part of a query state transmission example.

FIG. 20 illustrates a first part of a query state transmission example. FIG. 20 illustrates an example where the query with the query name 'Query1' is reassigned from the node 100 to the node 200. Upon receiving, from the management node 400, a query reassignment instruction indicating that the query is reassigned from the node 100 to the node 200, the node 100 serializes the query state of the query and then adds the query state to the transmission list 122. At the node 100, the query state is managed as being in transit. The node 100 keeps adding data to be transmitted to the transmission list 122 (i.e., buffering) until the transmission list 122 reaches a predetermined size.

(1) The node 100 sequentially acquires Events $\alpha1$, $\alpha2$, and $\alpha3$ during the buffering. The node 100 determines that Events $\alpha1$, —a2, and $\alpha3$ are events corresponding to the reassignment target query.

(2) The node 100 serializes Events $\alpha1$, $\alpha2$, and $\alpha3$ and then adds them in order to a list element of the query in the transmission list 122.

Figure 21:
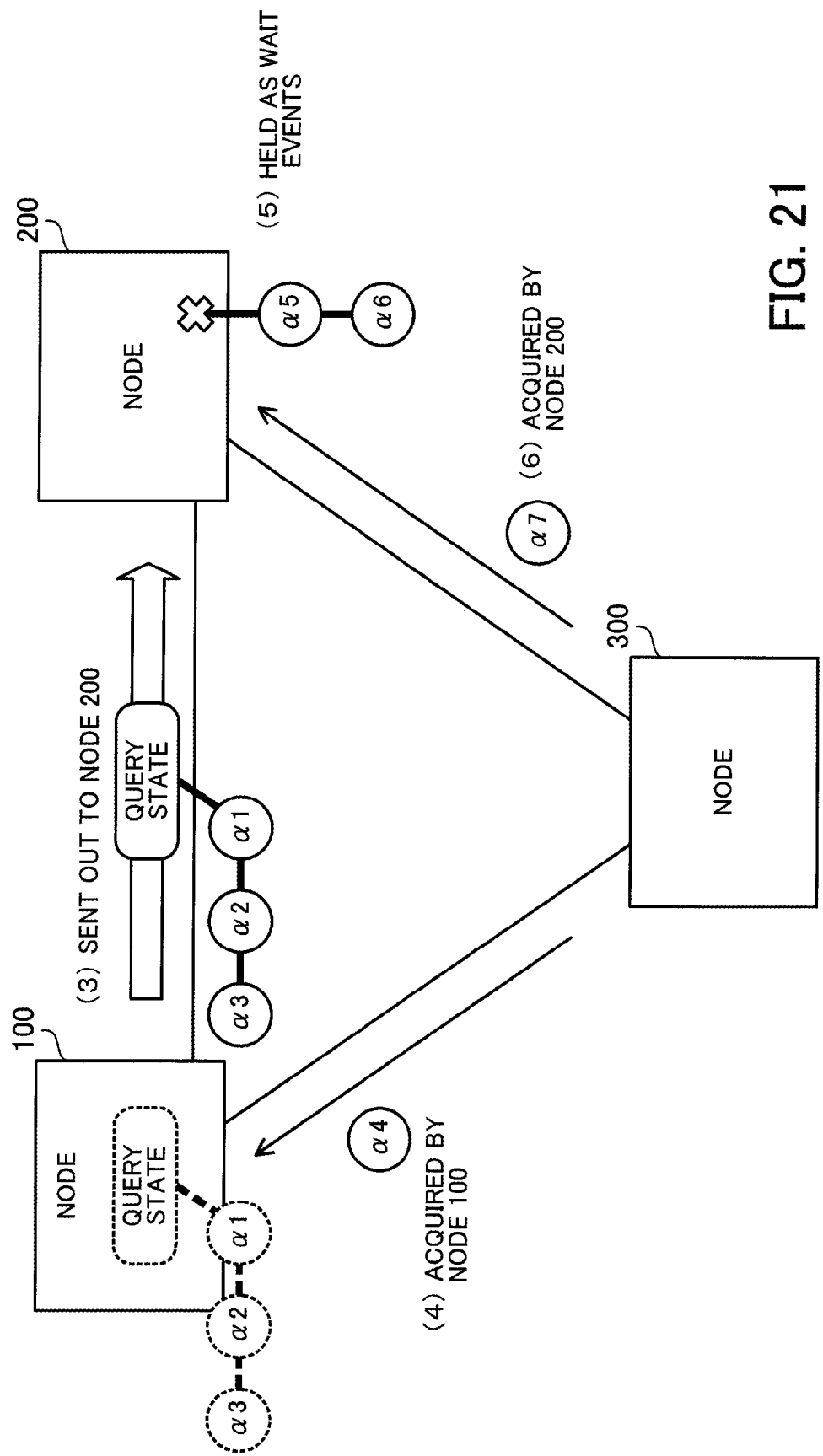
FIG. 21 illustrates a second part of the query state transmission example.

FIG. 21 illustrates a second part of the query state transmission example. FIG. 21 illustrates a process following the process of FIG. 20. Note that, in addition to Events $\alpha1$, $\alpha2$, and $\alpha3$ above, Events $\alpha4$, $\alpha5$, $\alpha6$, and $\alpha7$ are also events to be used in the query with the query name 'Query1'.

(3) When the data size of the transmission list 122 reaches the threshold, the node 100 sends out the content of the transmission list 122 to the node 200 through the network 10. Herewith, Events $\alpha1$, $\alpha2$, and $\alpha3$ are sent out together with the query state of the query with the query name 'Query1'.

(4) Next, the node 100 acquires Event $\alpha4$ from the node 300. Such a situation occurs when the node 300 sends out Event $\alpha4$ through the network 10 before the query reassignment instruction arrives at the node 300. Specifically, when the node 300 sends out Event $\alpha4$, the node 100 remains, in the query deployment table 321, as a node in charge of a query corresponding to Event $\alpha4$. As a result, the node 100 needs to transmit Event $\alpha4$ to the node 200 later than the transmission of Events $\alpha1$, $\alpha2$, and $\alpha3$.

(5) The node 200 acquires Events $\alpha5$ and $\alpha6$ before the content of the transmission list 122 transmitted by the node 100 arrives at the node 200. In this case, the node 200 holds Events $\alpha5$ and $\alpha6$ as wait events.

(6) The node 200 acquires Event $\alpha7$ from the node 300. Such a situation occurs when the node 300 sends out Event $\alpha7$ through the network 10 after the query reassignment instruction arrives at the node 300 (that is, in the query deployment table 321 of the node 300, a node in charge of a query corresponding to Event $\alpha7$ has been changed to the node 200).

According to the above example, upon receiving the query state and Events $\alpha1$, $\alpha2$, and $\alpha3$ from the node 100, the node 200 executes the query with the query name 'Query1' using the query state and Events $\alpha1$, $\alpha2$, and $\alpha3$. Subsequently, the node 200 executes the query using Events $\alpha5$ and $\alpha6$, which are wait events. Further, the node 200 executes the query using Events $\alpha4$ and $\alpha7$ in order of arrival.

Thus, the processing of Events $\alpha1$, $\alpha2$, and $\alpha3$ is sent to the node 200 together with the query state. Therefore, the node 200 after acquiring the query state is able to immediately execute the query with the query name 'Query1' using Events $\alpha1$, $\alpha2$, and $\alpha3$. That is, compared to the case where Events $\alpha1$, $\alpha2$, and $\alpha3$ are not transmitted to the node 200 together with the query state, it is possible to shorten the time to resume the execution of the query at the node 200.

Note here that, according to the method of the second embodiment, the query may be executed using the events in the order of Events $\alpha1$, $\alpha2$, $\alpha3$, $\alpha5$, $\alpha6$, $\alpha4$, and $\alpha7$, for example. On the other hand, some queries place importance on the chronological order of events. For example, there is sometimes the case that, if Events $\alpha1$, $\alpha2$, $\alpha3$, $\alpha4$, $\alpha5$, $\alpha6$, and $\alpha7$ occur in that order, a corresponding query is desired to be executed using these events in the chronological order (for example, in the case of scientific measurement where time differences among events are detected rigorously). In view of this, each query may include information defining whether the query needs to be executed using events strictly in chronological order or the query is allowed to be executed using events in an order different from the chronological order.

For each query allowed to be executed using events in an order different from the chronological order, annotation (i.e., metadata representing an explanatory note, which is, for example, a character string such as '@XXX') indicating the condition may be added to the query. For example, if the annotation is included in a query, events are transmitted together with the query state in the above-described manner. On the other hand, if the annotation is not included in a query, individual nodes suspend transmission of all events corresponding to the query to a node in charge of the query, for example, until the transmission of the query state is completed, and the node in charge is allowed to execute each of the events in chronological order after the completion of the transmission of the query state.

In this manner, it is possible to support both the method of executing a query by transmitting events together with the query state and the method of executing a query using events strictly in chronological order. Especially in the case where events are allowed to be processed regardless of the chronological order of the events, wait events (Events $\alpha5$ and $\alpha6$ in the example above) are processed without waiting for an event having not yet arrived (Event $\alpha4$). This allows a newly assigned node to resume event processing quickly.

In addition, when events are attached to the query state, the attached events are used first before using wait events. In this manner, although event processing in non-chronological order is allowed, the query execution is performed to a certain extent in chronological order of the events. This is because events attached to the query state are likely to have been generated before the occurrence of the wait events. Such an arrangement is effective in the case of allowing shuffling of the order of events with a relatively small difference in the time of occurrence of the events, but not allowing shuffling of the order of events with a relatively large difference in the time of occurrence of the events.

Note that, as for (4) in FIG. 21, if Event $\alpha4$ arrives and preparation for transmitting Event $\alpha4$ is ready before completion of sending out all the information included in the transmission list 122 to the network 10, information of Event $\alpha4$ may be slotted into the all information and sent out. For example, Event $\alpha4$ may be sent out prior to other information so that the node 100 provides the node 200 with Events $\alpha1$, $\alpha2$, $\alpha3$, and $\alpha4$ together with the query state.

Figure 22:
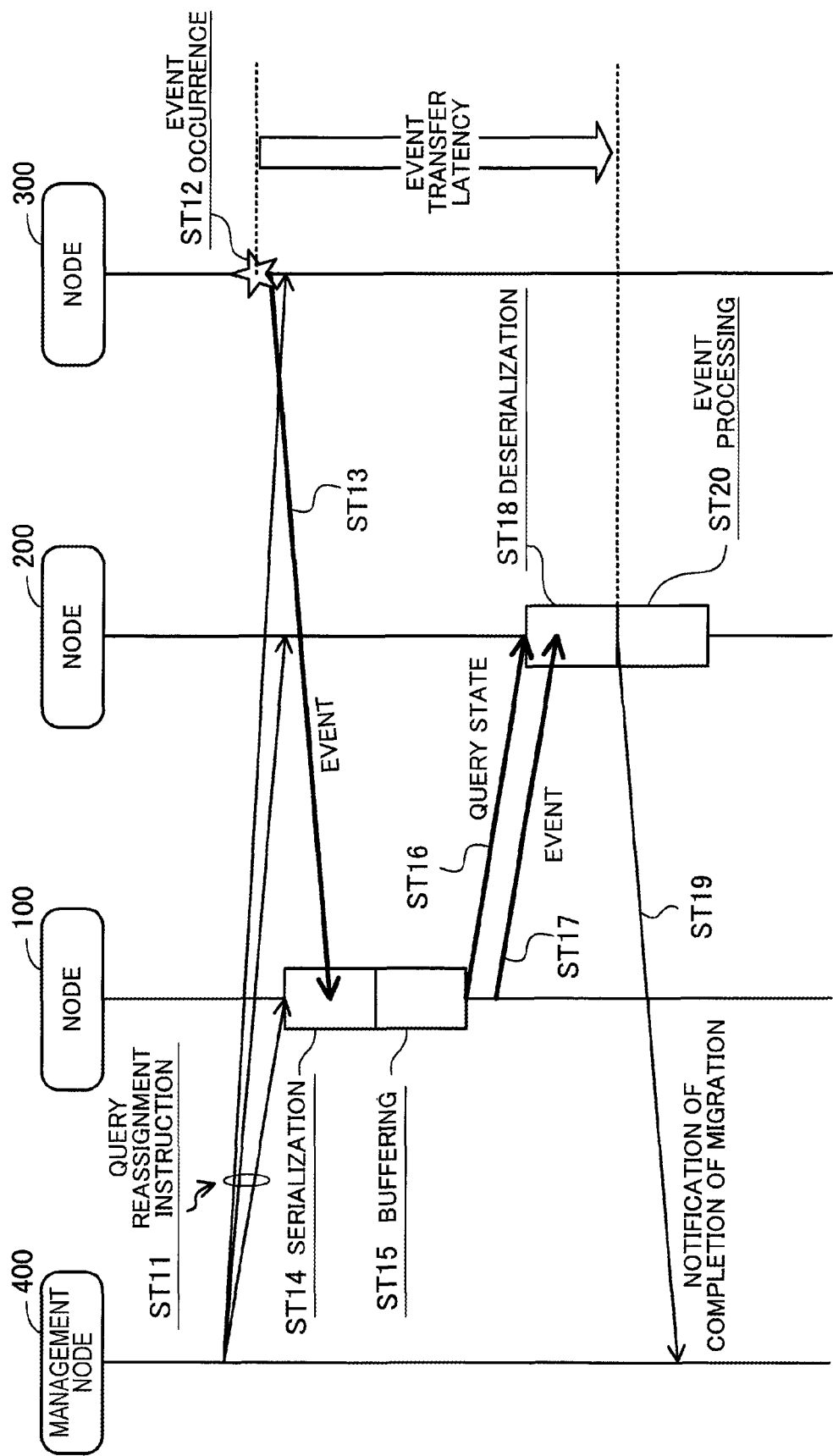
FIG. 22 is a sequence diagram illustrating a first example of query reassignment.

FIG. 22 is a sequence diagram illustrating a first example of query reassignment. The process of FIG. 22 is described next according to the step numbers in the sequence diagram.

(Step ST11) The management node 400 instructs, to each of the nodes 100, 200, and 300, reassignment of a query from the node 100 to the node 200. The instruction has not arrived at the nodes 100, 200, and 300 at this point in time.

(Step ST12) The node 300 acquires a new event (event occurrence at the node 300). This new event is an event corresponding to the reassigned query.

(Step ST13) The node 300 refers to the query deployment table 321 to determine that the node 100 is a node in charge of the query. The node 300 sends out the acquired event to the node 100. The event has not arrived at the node 100 at this point in time.

(Step ST14) Each of the nodes 100, 200, and 300 receives the instruction issued in step ST11. The nodes 100 and 200 manipulate the query deployment tables 121 and 221, respectively, to change information of the query in the status column to 'being migrated to node 200'. The node 300 changes, in the query deployment table 321, information of the query in the assigned node name to 'node 200'. The node 100 serializes the query state of the designated query and then adds a list element with the query state registered to the transmission list 122. Subsequently, the node 100 receives the event corresponding to the query from the node 300. The node 100 serializes the event and adds the serialized event to the list element with the query state.

(Step ST15) The node 100 keeps buffering until the data size of the transmission list 122 exceeds or becomes equal to a threshold.

(Step ST16) Once the data size of the transmission list 122 exceeds or becomes equal to the threshold, the node 100 sends out content of the transmission list 122 to the node 200. At this point, the node 100 also sends out the query state registered in the transmission list 122 in step ST14.

(Step ST17) The node 100 also sends out the event added to the query state in step ST14.

(Step ST18) Upon receiving the query state from the node 100, the node 200 deserializes the query state. Upon receiving the event attached to the query state from the node 100, the node 200 deserializes the event.

(Step ST19) The node 200 notifies the management node 400 of completion of the migration of the query state.

(Step ST20) The node 200 executes the query reassigned to the node 200 from the node 100 using the query state and event acquired in step ST18.

As described above, the event corresponding to the reassigned query may be sent out from the node 300 to the node 100 before the query reassignment instruction arrives at the node 300. In this case, delay time (referred to as 'event transfer latency') until the newly assigned node 200 starts executing the reassigned query using the event corresponds to a period from the start of step ST12 to the completion of step ST18. Note that the management node 400 may notify the nodes 100, 200, and 300 of the completion of the query reassignment after step ST19.

Figure 23:
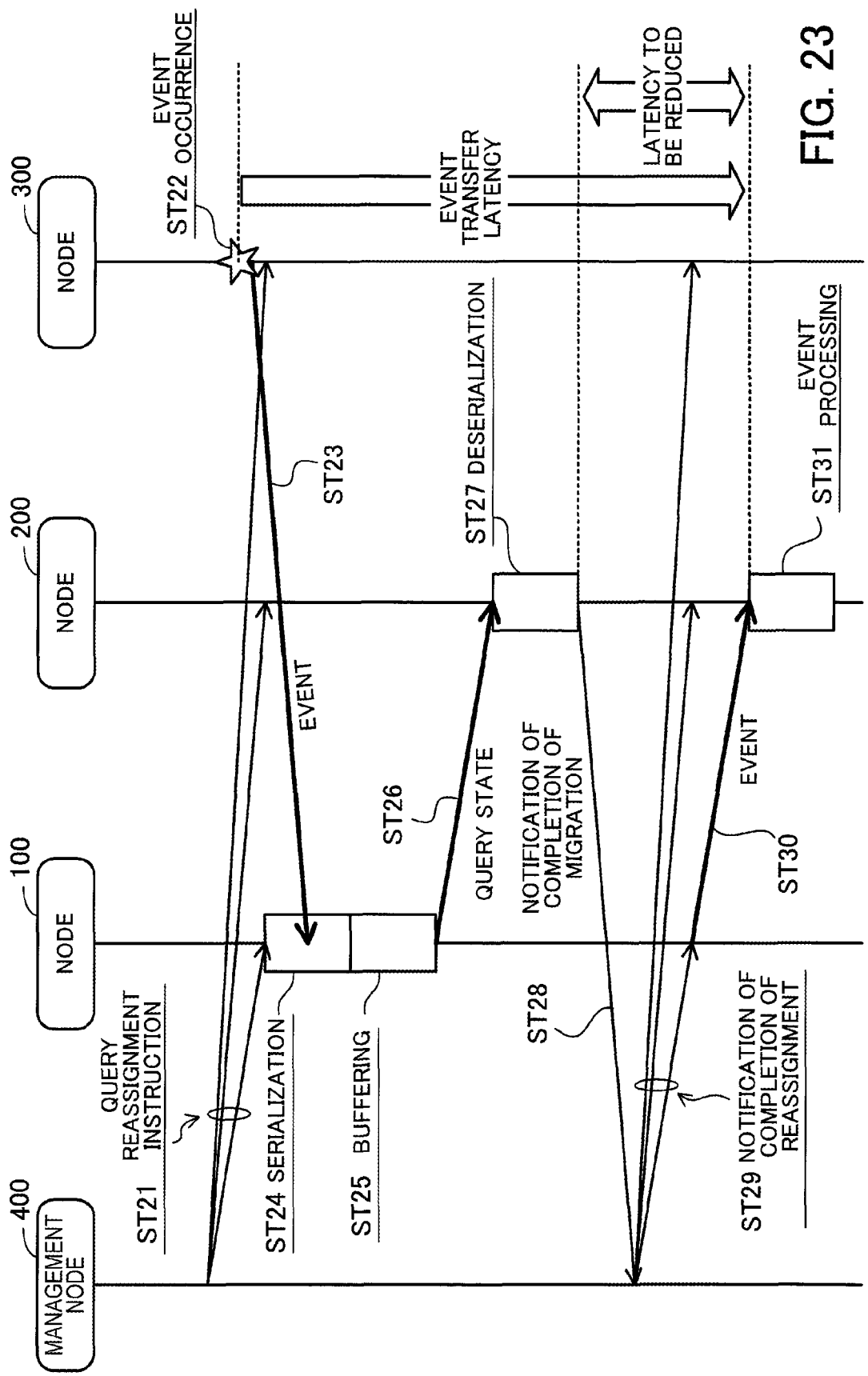
FIG. 23 is a sequence diagram illustrating a first example of comparative query reassignment.

FIG. 23 is a sequence diagram illustrating a first example of comparative query reassignment. The process of FIG. 23 is described next according to the step numbers in the sequence diagram. FIG. 23 presents a comparative example against FIG. 22, in which the method of the second embodiment is not employed. In the description of FIG. 23, individual nodes are designated with the same reference numerals as those of the second embodiment for descriptive purposes.

(Step ST21) The management node 400 instructs, to each of the nodes 100, 200, and 300, reassignment of a query from the node 100 to the node 200. The instruction has not arrived at the nodes 100, 200, and 300 at this point in time.

(Step ST22) The node 300 acquires a new event (event occurrence at the node 300). This new event is an event corresponding to the reassigned query.

(Step ST23) The node 300 determines that the node 100 is a node in charge of the query. The node 300 sends out the acquired event to the node 100. The event has not arrived at the node 100 at this point in time.

(Step ST24) Each of the nodes 100, 200, and 300 receives the instruction issued in step ST21. The node 100 serializes the query state of the designated query and then adds the serialized query state to transmission data. Subsequently, the node 100 receives the event corresponding to the query from the node 300.

(Step ST25) The node 100 keeps buffering until the data size of the transmission data exceeds or becomes equal to a threshold.

(Step ST26) Once the data size of the transmission data exceeds or becomes equal to the threshold, the node 100 sends out content of the transmission data to the node 200. The transmission data includes the query state of the reassigned query, but does not include the event received in step ST24.

(Step ST27) Upon receiving the query state from the node 100, the node 200 deserializes the query state.

(Step ST28) The node 200 notifies the management node 400 of completion of the migration of the query state.

(Step ST29) The management node 400 notifies each of the nodes 100, 200, and 300 of the completion of the query reassignment. The nodes 100, 200, and 300 individually receive the notification.

(Step ST30) The node 100 transmits the event received from the node 300 to the newly assigned node 200 in charge of the query (note that serialization and buffering are also performed for the event). Upon receiving the event from the node 100, the node 200 deserializes the event.

(Step ST31) The node 200 executes the query reassigned from the node 100 to the node 200, using the query state acquired in step ST27 and the event acquired in step ST30.

In the case of the comparative example above, the event transfer latency until the node 200 finishes receiving the event having occurred at the node 300 corresponds to a period from the start of step ST22 to the completion of step ST30. According to the comparative example, the event transfer latency is longer with an extra period of time corresponding to steps ST28 to ST30, compared to the case of FIG. 22. Especially, step ST30 includes a plurality of process phases, such as lock wait, buffering, transfer, deserialization, registration, and unlock wait as in the case of steps ST24 to ST26 although not illustrated in FIG. 23. Therefore, the event transfer latency of the comparative example also includes the latency for processing these phases.

On the other hand, in the case of FIG. 22, the delay time corresponding to steps ST28 to ST30 is eliminated. Therefore, it is possible to shorten the delay in resuming execution of the reassigned query at the node 200, compared to the comparative example.

Note that, if the data size of the transmission data has not reached the threshold in steps ST24 and ST25, the event sent from the node 300 may be transmitted to the node 200 together with the query state in step ST26. Note however that, in the case of the comparative example, the transmission data is simply buffered. That is, unlike the second embodiment, the query state and the event are not managed as an integrated entity using the transmission data management structure D. As a result, the query state and the event with no association between them are transmitted from the node 100 to the node 200. In this case, the node 200 may involve cost for calculation and a delay associated with searching the received data for a query state and an event related to the query state. The calculation cost and delay are targets for improvement.

On the other hand, in the case of FIG. 22, a query state and an event are managed together using the transmission data management structure D. This allows the query state and the event to be sequentially transmitted from the node 100. When deserializing received data, the node 200 extracts an event immediately after a query state to thereby determine that the event is associated with the immediately preceding query state. That is, by allowing the node 200 to efficiently acquire the query state and the event, it is possible to achieve a further reduction in the delay in resuming execution of the reassigned query (i.e., it is possible to improve the above-mentioned calculating cost and delay). Thus, it is preferable that the query state and the event be sequentially transmitted from the node 100.

Figure 24:
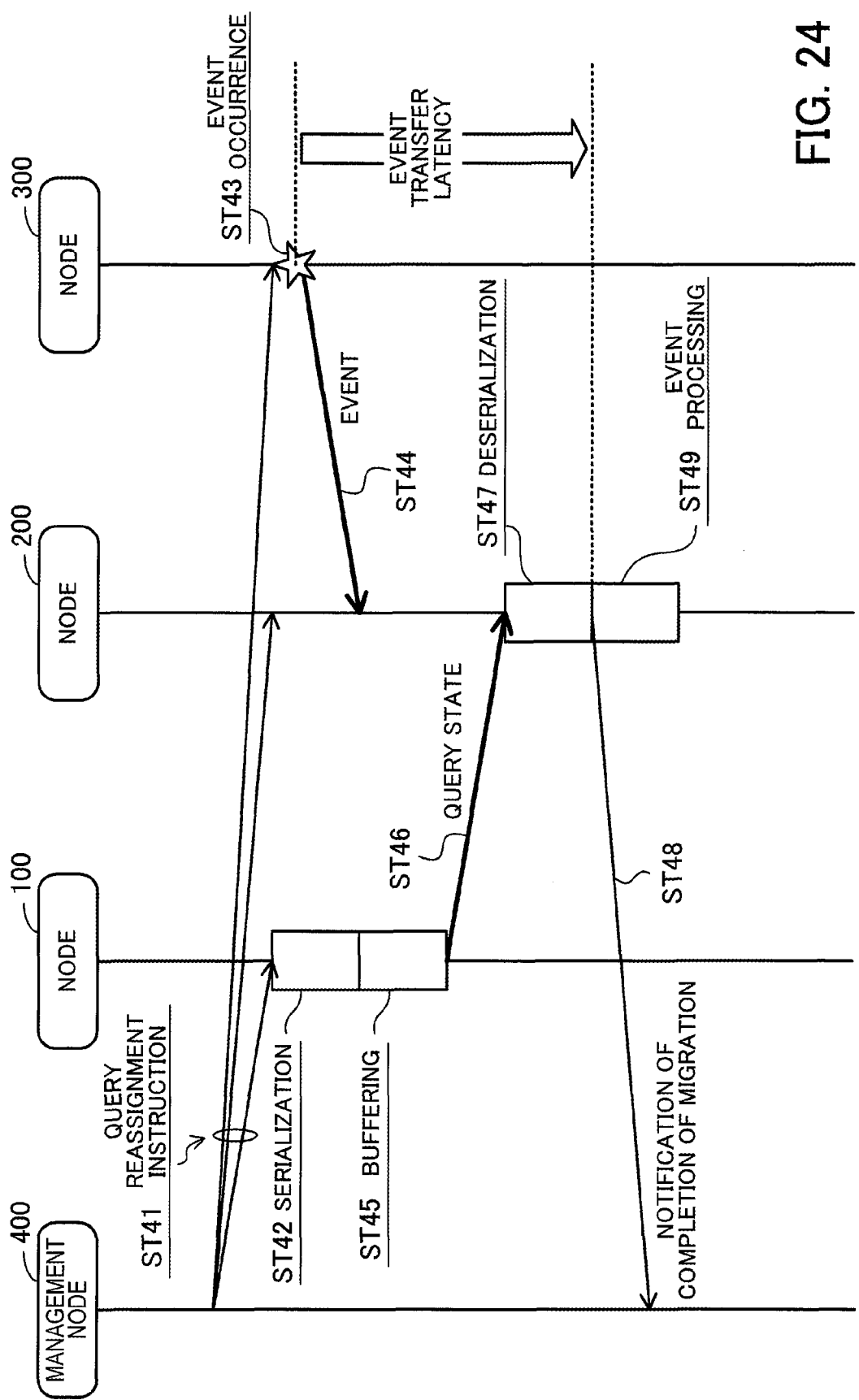
FIG. 24 is a sequence diagram illustrating a second example of the query reassignment.

FIG. 24 is a sequence diagram illustrating a second example of the query reassignment. The process of FIG. 24 is described next according to the step numbers in the sequence diagram.

(Step ST41) The management node 400 instructs, to each of the nodes 100, 200, and 300, reassignment of a query from the node 100 to the node 200.

(Step ST42) Each of the nodes 100, 200, and 300 receives the instruction issued in step ST41. The nodes 100 and 200 manipulate the query deployment tables 121 and 221, respectively, to change information of the query in the status column to 'being migrated to node 200'. The node 300 changes, in the query deployment table 321, information of the query in the assigned node name to 'node 200'. The node 100 serializes the query state of the designated query and then adds the query state to the transmission list 122.

(Step ST43) The node 300 acquires a new event (event occurrence at the node 300). This new event is an event corresponding to the reassigned query.

(Step ST44) The node 300 refers to the query deployment table 321 to determine that the node 200 is a node in charge of the query. The node 300 sends out the acquired event to the node 200. Subsequently, the node 200 receives the event and then deserializes the received event. The node 200 registers the event in the query deployment table 221 as a wait event of the reassigned query. This is because, in the query deployment table 221 of the node 200, 'being migrated to its own node (the node 200 in this case)' is set in the field in the status column of a query corresponding to the event received from the node 300.

(Step ST45) The node 100 keeps buffering until the data size of the transmission list 122 exceeds or becomes equal to a threshold.

(Step ST46) Once the data size of the transmission list 122 exceeds or becomes equal to the threshold, the node 100 sends out content of the transmission list 122 to the node 200.

(Step ST47) Upon receiving the query state from the node 100, the node 200 deserializes the query state.

(Step ST48) The node 200 notifies the management node 400 of completion of the migration of the query state.

(Step ST49) The node 200 executes the query reassigned to the node 200 from the node 100 using the query state acquired in step ST46 and the event acquired in step ST44 (the wait event).

As described above, an event corresponding to the reassigned query may be sent out from the node 300 to the node 200 immediately after the query reassignment instruction arrives at the node 300. In this case, the event transfer latency corresponds to a period from the start of step ST43 to the completion of step ST47. Note that the management node 400 may notify the nodes 100, 200, and 300 of the completion of the query reassignment after step ST48.

Figure 25:
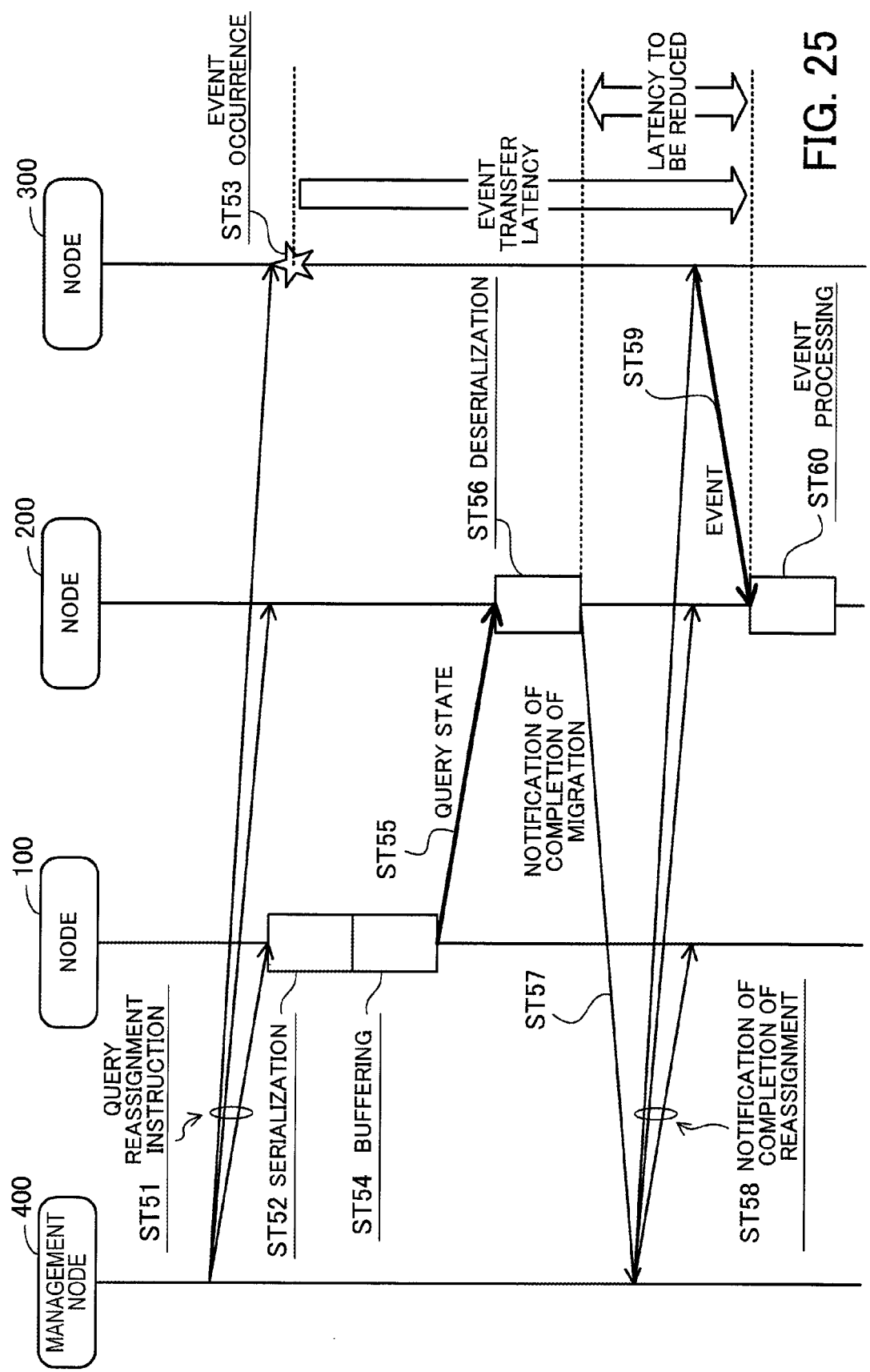
FIG. 25 is a sequence diagram illustrating a second example of the comparative query reassignment.

FIG. 25 is a sequence diagram illustrating a second example of the comparative query reassignment. The process of FIG. 25 is described next according to the step numbers in the sequence diagram. FIG. 25 presents a comparative example against FIG. 24, in which the method of the second embodiment is not employed. In the description of FIG. 25, individual nodes are designated with the same reference numerals as those of the second embodiment for descriptive purposes.

(Step ST51) The management node 400 instructs, to each of the node 100, 200, and 300, reassignment of a query from the node 100 to the node 200.

(Step ST52) Each of the nodes 100, 200, and 300 receives the instruction issued in step ST51. The node 100 serializes the query state of the designated query and then adds the query state to the transmission data.

(Step ST53) The node 300 acquires a new event (event occurrence at the node 300). This new event is an event corresponding to the reassigned query. After detecting that the event corresponds to the reassigned query, the node 300 withholds the provision of the event to a node in charge of the query.

(Step ST54) The node 100 keeps buffering until the data size of the transmission data exceeds or becomes equal to a threshold.

(Step ST55) Once the data size of the transmission data exceeds or becomes equal to the threshold, the node 100 sends out content of the transmission data to the node 200. The transmission data includes the query state.

(Step ST56) Upon receiving the query state from the node 100, the node 200 deserializes the query state.

(Step ST57) The node 200 notifies the management node 400 of completion of the migration of the query state.

(Step ST58) The management node 400 notifies each of the nodes 100, 200, and 300 of the completion of the query reassignment. The nodes 100, 200, and 300 individually receive the notification.

(Step ST59) The node 300 determines that a destination of the event acquired in step ST53 is the node 200. The node 300 transmits the event to the node 200 (note that serialization and buffering are also performed for the event). Upon receiving the event from the node 300, the node 200 deserializes the event.

(Step ST60) The node 200 executes the query reassigned from the node 100 to the node 200, using the query state acquired in step ST56 and the event acquired in step ST59.

In the case of the comparative example above, the event transfer latency before the node 200 finishes receiving the event having occurred at the node 300 corresponds to a period from the start of step ST53 to the completion of step ST59. According to the comparative example, the event transfer latency is longer with an extra period of time corresponding to steps ST57 to ST59, compared to the case of FIG. 24. Especially, step ST59 includes a plurality of process phases, such as lock wait, buffering, transfer, deserialization, registration, and unlock wait as in the case of steps ST52 to ST56 although not illustrated in FIG. 25. Therefore, the event transfer latency of the comparative example also includes the latency for processing these phases.

On the other hand, in the case of FIG. 24, transmission of the event from the node 300 to the node 200 is allowed in step ST44, and the node 200 manages the event as a wait event. As a result, the delay time corresponding to steps ST57 to ST59 is eliminated. That is, it is possible to shorten the delay in resuming execution of the reassigned query at the node 200, compared to the comparative example.

Figure 26:
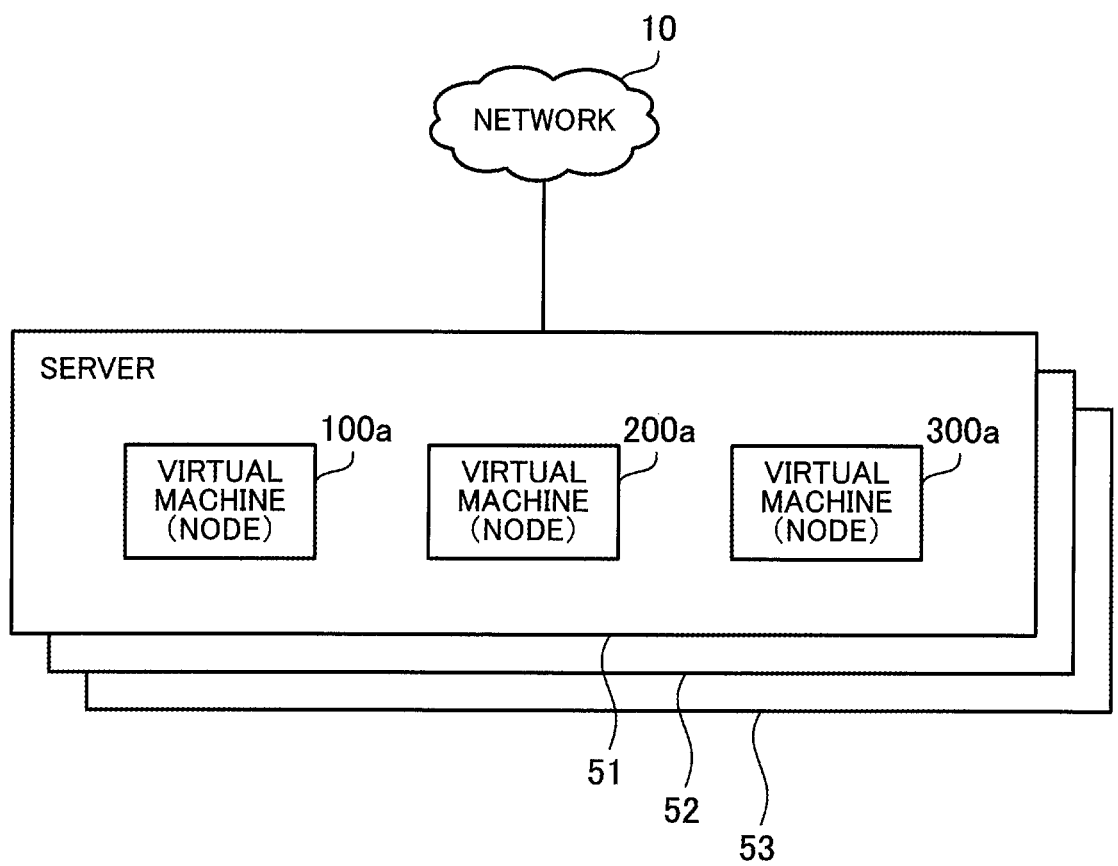
FIG. 26 illustrates another example of the distributed processing system.

FIG. 26 illustrates another example of the distributed processing system. FIG. 2 illustrates an example of implementing the nodes 100, 200, and 300 using server computers (physical machines). On the other hand, each node may be implemented by a virtual machine. For example, servers 51, 52, and 53 are connected to the network 10. Note that FIG. 26 omits illustrations of the network 20 and other apparatuses.

For example, the servers 51, 52, and 53 execute supervisory software called hypervisor or virtual machine monitor and allocate resources, such as CPUs and RAM, provided in the servers 51, 52, and 53 to a plurality of virtual machines on the servers 51, 52, and 53. For example, the server 51 includes virtual machines 100a, 200a, and 300a.

The virtual machines 100a, 200a, and 300a may be used as nodes for distributed processing. For example, the virtual machine 100a is able to implement the same functions as the node 100. The virtual machine 200a is able to implement the same functions as the node 200. The virtual machine 300a is able to implement the same functions as the node 300. Note that both physical and virtual machines may be used as nodes for distributed processing. Also in the case where distributed processing is performed using the virtual machines 100a, 200a, and 300a, it is possible to shorten the delay in resuming the execution of a query at a newly assigned destination. That is, the nodes 100, 200, and 300 are an example of the machines (physical machines) of the first embodiment. The virtual machines 100a, 200a, and 300a are an example of the machines (virtual machines) of the first embodiment.

In the above-described example, each query is assigned to a node. However, query assignment may be made based on a query and a predetermined key included in each event corresponding to the query. It is sometimes the case that, as for one query, different nodes are desired to be assigned according to the keys. Assume for example that each event includes information (a key) indicating one of a plurality of regions, in which the event has occurred, and a different node is desired to be in charge of each of the regions. In this case, in the query deployment tables 121, 221, and 321, each assigned node name is managed in association with a pair of a query and a key. Also in this case, the same method described above may be applied by designating a query name to each query-and-key pair.

Note that the information processing of the first embodiment is implemented by causing the calculating unit 1b to execute a program. Also, the information processing of the second embodiment is implemented by causing the processor 101 to execute a program. The program may be recorded in a computer-readable storage medium (for example, the optical disk 13, the memory device 14, or the memory card 16).

For example, storage media on which the program is recorded are distributed in order to distribute the program. In addition, the program may be stored in a different computer and then distributed via a network. A computer stores, or installs, the program recorded in a storage medium or received from the different computer in a storage device, such as the RAM 102 and the HDD 103, and reads the program from the storage device to execute it.

According to one aspect, it is possible to shorten the delay in resuming a process at a newly assigned destination.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A data processing management method executed in a system including a first computer and a second computer, the data processing management method comprising:
    executing, by a first processor included in the first computer, a process corresponding to an event pattern in response to an arrived event belonging to the event pattern, and recording the arrived event in a memory, the event pattern indicating a plurality of events and stored in the memory;
    receiving an instruction to reassign the process to the second computer;
    receiving a first event belonging to the event pattern during preparation for transmission of progress information indicating the arrived event;
    generating, by the first processor, transmission data including the progress information and the first event; and
    transmitting, by the first computer, the transmission data to the second computer;
    receiving, by the second computer, a second event belonging to the event pattern prior to arrival of the transmission data and holding the second event by using a storage device;
    executing, by a second processor included in the second computer, the process using the transmission data and the second event; and
    receiving, by the second computer, a third event belonging to the event pattern after the executing of the process using the transmission data and the second event, the third event occurring before the second event.

2. The data processing management method according to claim 1, wherein:
    the executing of the process by the second processor includes executing the process using the progress information and the first event upon reception of the transmission data, and subsequently executing the process using the second event.

3. The data processing management method according to claim 1, wherein:
    the first computer sequentially transmits the progress information and the first event.

4. The data processing management method according to claim 1, further comprising:
    stopping, by the first processor, execution of the process upon the reception of the instruction; and
    resuming, by the second processor, the process using the progress information and the first event.

5. An information processing apparatus comprising:
    a first information processing apparatus and a second information processing apparatus,
    the first information processing apparatus including:

a first memory configured to store an event pattern indicating a plurality of events corresponding to a process; and a first processor configured to perform a procedure including:

executing the process in response to an arrived event belonging to the event pattern, and recording the arrived event in the first memory;

receiving an instruction to reassign the process to the second a information processing apparatus;

receiving a first event belonging to the event pattern during preparation for transmission of progress information indicating the arrived event;

generating transmission data including the progress information and the first event; and transmitting the transmission data to the second information processing apparatus, the second information processing apparatus including:

a second memory configured to store a second event belonging to the event pattern; and a second processor configured to perform a procedure including:

receiving the second event prior to arrival of the transmission data and holding the second event by using the second memory;

executing the process using the transmission data and the second event; and receiving a third event belonging to the event pattern after the executing of the process using the transmission data and the second event, the third event occurring before the second event.

6. A non-transitory computer-readable storage medium storing therein a data processing management program that causes a computer to perform a process comprising:

receiving a second event belonging to an event pattern prior to arrival of transmission data and holding the second event by using a storage device, wherein the event pattern is used for executing a process, the transmission data includes progress information indicating an arrived event belonging to the event pattern and a first event belonging to the event pattern and is transmitted by a different computer when an instruction is received by the different computer, the instruction is for reassigning the process executed by the different computer to the computer, the arrived event arrives at the different computer before the instruction, and the first event arrives at the different computer after the instruction;

executing the process using the transmission data and the second event; and receiving a third event belonging to the event pattern after the executing of the process using the transmission data and the second event, the third event occurring before the second event.

* * * * *